US008773398B2

(12) United States Patent
Funo et al.

(10) Patent No.: US 8,773,398 B2
(45) Date of Patent: Jul. 8, 2014

(54) DATA INPUT SYSTEM

(75) Inventors: Hiroyuki Funo, Kanagawa (JP); Masao Watanabe, Kanagawa (JP); Takayuki Takeuchi, Kanagawa (JP); Yoshinori Machida, Kanagawa (JP); Kiyoshi Iida, Kanagawa (JP); Ryota Mizutani, Kanagawa (JP); Yasuaki Konishi, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1433 days.

(21) Appl. No.: 12/039,343

(22) Filed: Feb. 28, 2008

(65) Prior Publication Data

US 2008/0297489 A1 Dec. 4, 2008

(30) Foreign Application Priority Data

May 28, 2007 (JP) ................. 2007-140243

(51) Int. Cl.
*G06F 3/042* (2006.01)
(52) U.S. Cl.
USPC ........... 345/175; 345/156; 345/173; 232/454; 232/436; 232/460; 232/462; 232/472
(58) Field of Classification Search
None
See application file for complete search history.

(56) References Cited

U.S. PATENT DOCUMENTS

| 2001/0028000 A1* | 10/2001 | Yoshioka | 235/494 |
| 2001/0048416 A1* | 12/2001 | Miyamoto et al. | 345/87 |
| 2002/0046887 A1* | 4/2002 | Yanagisawa et al. | 178/18.01 |
| 2003/0104938 A1 | 6/2003 | Torii et al. | |
| 2004/0035935 A1* | 2/2004 | Takahashi et al. | 235/462.09 |

FOREIGN PATENT DOCUMENTS

| JP | A-8-36456 | 2/1996 | |
| JP | A-9-185669 | 7/1997 | |
| JP | B-2833975 | 10/1998 | |
| JP | A-2000-293303 | 10/2000 | |
| JP | A-2002-82764 | 3/2002 | |
| JP | A-2002-082771 | 3/2002 | |
| JP | A-2003-511762 | 3/2003 | |
| JP | A-2003-256383 | 9/2003 | |
| JP | A-2004-152273 | 5/2004 | |
| JP | A-2004-287068 | 10/2004 | |
| JP | A-2005-037768 | 2/2005 | |
| JP | 2005-134627 | * 5/2005 | ................ G02F 1/17 |
| JP | A-2005-134627 | 5/2005 | |
| WO | WO 2004/113093 A1 | 12/2004 | |

OTHER PUBLICATIONS

Japanese Office Action issued Jul. 19, 2011 in corresponding Japanese Application No. 2007-140243 (with English translation).

* cited by examiner

*Primary Examiner* — Jesus Hernandez
(74) *Attorney, Agent, or Firm* — Oliff PLC

(57) ABSTRACT

A data input system including electronic paper and a stylus writing device is disclosed. The electronic paper includes a transparent display substrate on which a number of optically readable code patterns have been formed, the optically readable code patterns representing positional information on a display surface, a rear surface substrate opposing the display substrate, and coloring particles that are enclosed between the display substrate and the rear surface substrate and that are movable by applying an electric or a magnetic field. The electronic paper displays an image due to motion of the particle. The stylus writing device includes a writing head provided at the end of the stylus for writing the image by applying an electric or a magnetic field to the electronic paper by contact and includes an optical reading device for optically reading the code patterns formed on the display surface where the end of the stylus contacts.

15 Claims, 24 Drawing Sheets

9C2

PATTERN 32
SYNCHRONOUS SIGNAL

PATTERN 33
ROTATE IN RIGHT
DIRECTION BY
90 DEGREES

PATTERN 34
ROTATE IN RIGHT
DIRECTION BY
180 DEGREES

PATTERN 35
ROTATE IN RIGHT
DIRECTION BY
270 DEGREES

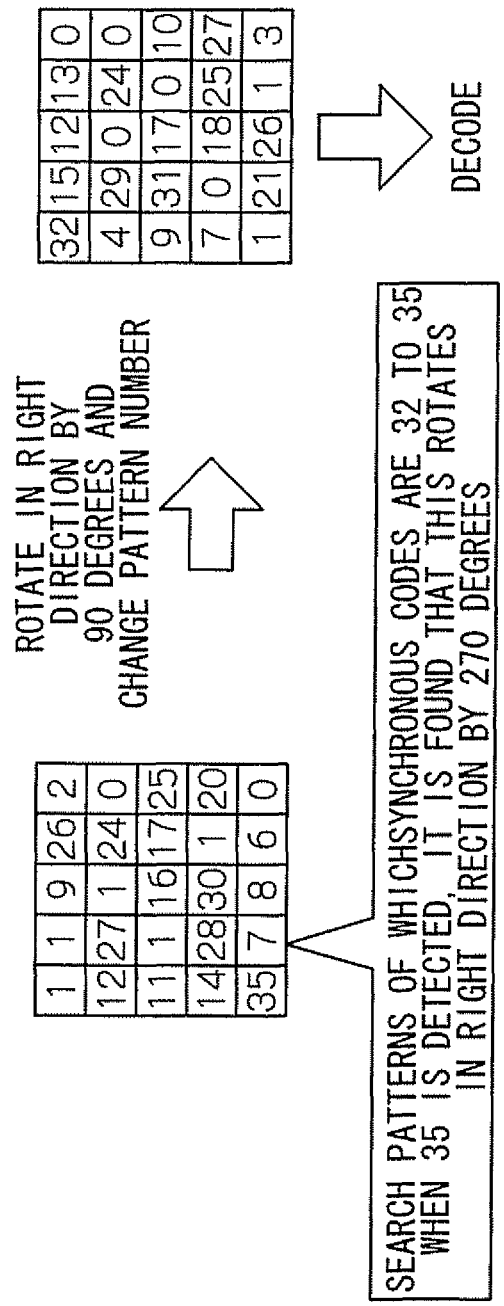

DATA INPUT SYSTEM

CROSS-REFERENCE TO RELATED APPLICATION

This application is based on and claims priority under 35 USC 119 from Japanese Patent Application No. 2007-140243 filed May 28, 2007.

BACKGROUND

1. Technical Field

The present invention relates to a data input system.

2. Related Art

Recently, as a display media to replace paper, electronic paper has been popularized. Electronic paper has visibility, flexibility and portability like paper, and it is also possible to electrically overwrite the display content. Also, since electronic paper does not require a backlight, power consumption is small, and is capable of retaining the display content after cutting off the power supply. Electronic paper has been developed with a variety of display methods, for example, such as a method for displaying images by rotation of two-color particles, which is called as a twist ball, and a method for displaying images by motion of charged particles or magnetic particles.

Also, it is possible to perform handwritten input to electronic paper by using a stylus writing device. In order to convert a handwritten input image to electronic data (digitizing), a coordinate input device, which is called as a digitizer, is used. The digitizer is generally formed of a stylus or mouse-type input device for indicating a position on a screen (stylus pen, for example), and a plate-like detecting device (tablet, for example) for detecting the position. For electronic paper that is not provided with a tablet or the like, digitizing is performed by setting the electronic paper sheets one by one in a complicated detecting device and performing handwritten input.

SUMMARY

According to an aspect of the invention, there is provided a data input system including: electronic paper provided with a transparent display substrate on which a number of optically readable code patterns have been formed, the optically readable code patterns representing positional information on a display surface, a rear surface substrate opposing the display substrate, and coloring particles that are enclosed between the display substrate and the rear surface substrate and that are movable by applying an electric field or a magnetic field, the electronic paper displaying an image by motion of the coloring particles; and a stylus writing device provided with a writing head provided at the end of the stylus for writing an image by applying the electric field or the magnetic field to the electronic paper by contact, and an optical reading device for optically reading the code patterns formed on the display surface where the end of the stylus contacts.

BRIEF DESCRIPTION OF THE DRAWINGS

Exemplary embodiments of the present invention will be described in detail based on the following figures wherein:

FIG. 18 is a diagram for illustrating a method for correcting a direction of the code pattern by the synchronous code;

DETAILED DESCRIPTION

Hereinafter, an exemplary embodiment of the invention will be described in detail with reference to the drawings.

—Data Input System—

Figure 1:
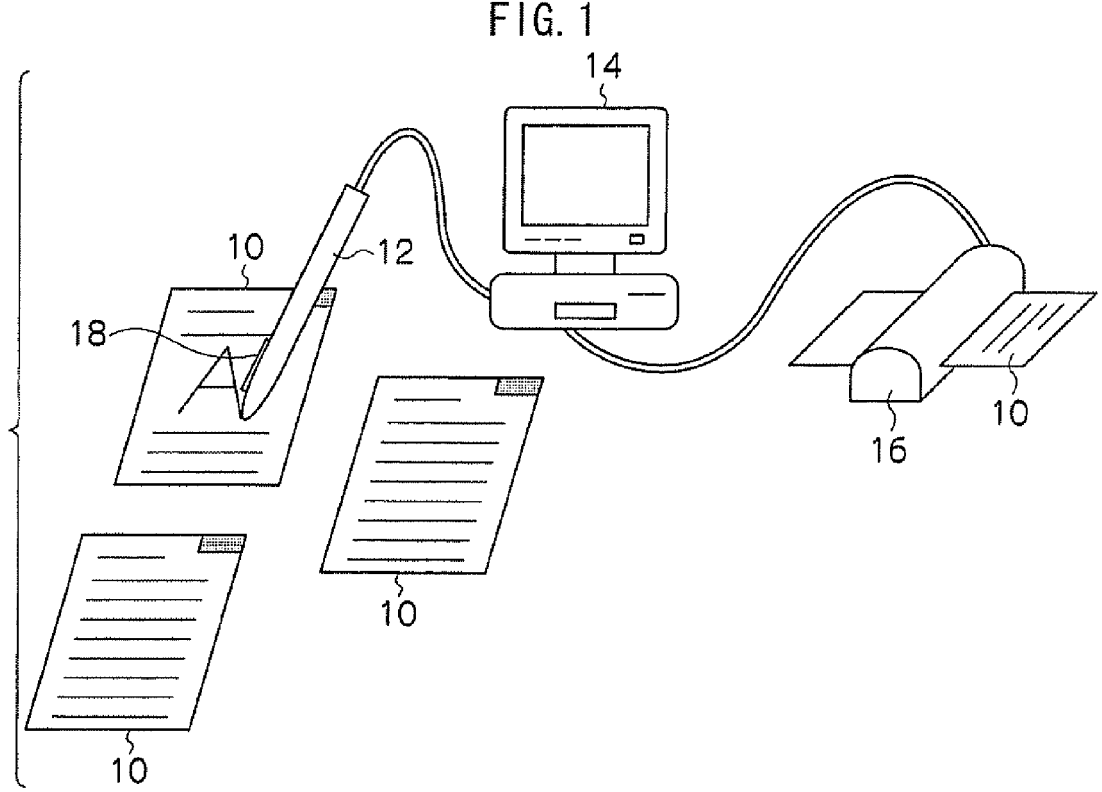
FIG. 1 is a schematic diagram showing a structure of a data input system according to an exemplary embodiment of the present invention.

FIG. 1 is a schematic diagram showing a structure of a data input system according to the exemplary embodiment of the invention. The data input system is provided with rectangular sheet-shaped electronic paper 10 for displaying an image and a stylus writing device 12 for handwritten inputting a display image to the electronic paper 10. It is also possible to handwritten input on the image displayed on the electronic paper 10 by the stylus writing device 12. Also, it is possible to delete the image displayed on the electronic paper 10 and overwrite a new image repeatedly. The detailed configuration of the electronic paper 10 will be described later.

On a display surface of the electronic paper 10 for displaying the image, a number of code patterns for representing positional information are formed. For example, when the positional information is represented by a two-dimensional coordinate system such as an x-y coordinate system, the code pattern represents x-coordinate and y-coordinate. On the other hand, the stylus writing device 12 is provided with an optical sensor 18 for taking an image of the display surface in the vicinity of the end of the stylus (a penpoint) every predetermined time while performing the handwritten input, and optically reading the code pattern in an imaging area. The stylus writing device 12 decodes the code pattern, which is read by the optical sensor 18, to obtain positional information (stroke) of the penpoint one after another. Thereby, handwritten input data may be obtained.

The stylus writing device 12 is connected to a computer 14. The computer 14 performs management of document data and the handwritten input data, image processing such as synthesis of a document image and a handwritten input image, and print instruction. The handwritten input data obtained by the stylus writing device 12 is input to the computer 14 and is stored in a storage device not shown. When the handwritten input is performed on the document image displayed on the electronic paper 10, the handwritten input data is related to the document data and is stored. A printer-type writing device 16 for writing the display image on the electronic paper 10 according to the print instruction from the computer 14 is connected to the computer 14. Also, the printer-type writing device 16 may delete the displayed image on the electronic paper 10 at once.

FIGS. 2A to 2D are schematic diagrams, each showing the image displayed on the electronic paper 10. Hereinafter, a case in which the handwritten input is performed with the stylus writing device 12 on the document image displayed on the electronic paper 10 will be described.

Figure 2A:
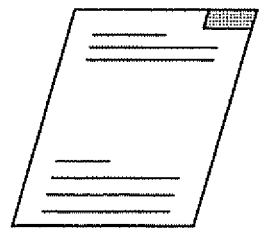
FIGS. 2A-2D are schematic diagrams each showing an image displayed on electronic paper.
Figure 2B:
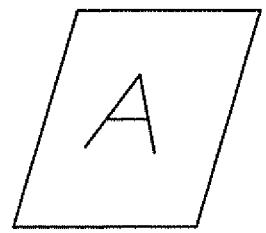
Figure 2C:
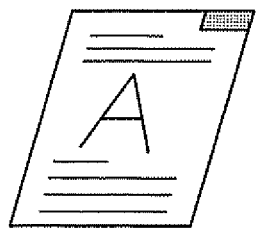

First, the document image is written on the electronic paper 10 with the printer-type writing device 16. The document image shown in FIG. 2A is displayed on the electronic paper 10. Next, the handwritten input is performed on the displayed image with the stylus writing device 12. The handwritten input image is the image representing a character "A" as shown in FIG. 2B. At that time, an overwritten image shown in FIG. 2C is displayed on the electronic paper 10. The overwritten image is the image obtained by synthesizing the document image shown in FIG. 2A with the handwritten input image shown in FIG. 2B.

Figure 2D:
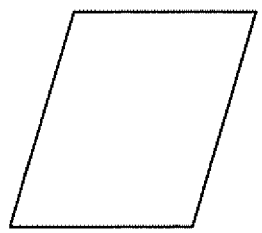

Next, the displayed image on the electronic paper 10 is deleted at once with the printer-type writing device 16. As shown in FIG. 2D, the electronic paper 10 returns to blank paper (non-displayed state). With the electronic paper 10, which is not integrated with the storage device, it is not possible in general to display the overwritten image shown in FIG. 2C again in a power-off state. However, in this exemplary embodiment, since the handwritten input data is related to the document data and is stored, it is possible to perform the image processing to synthesize the document image and the handwritten input image by the computer 14 and to write the synthesized image on the electronic paper 10 with the printer-type writing device 16. At that time, the overwritten image shown in FIG. 2C is again displayed on the electronic paper 10.

—Code Pattern—

Figure 3:
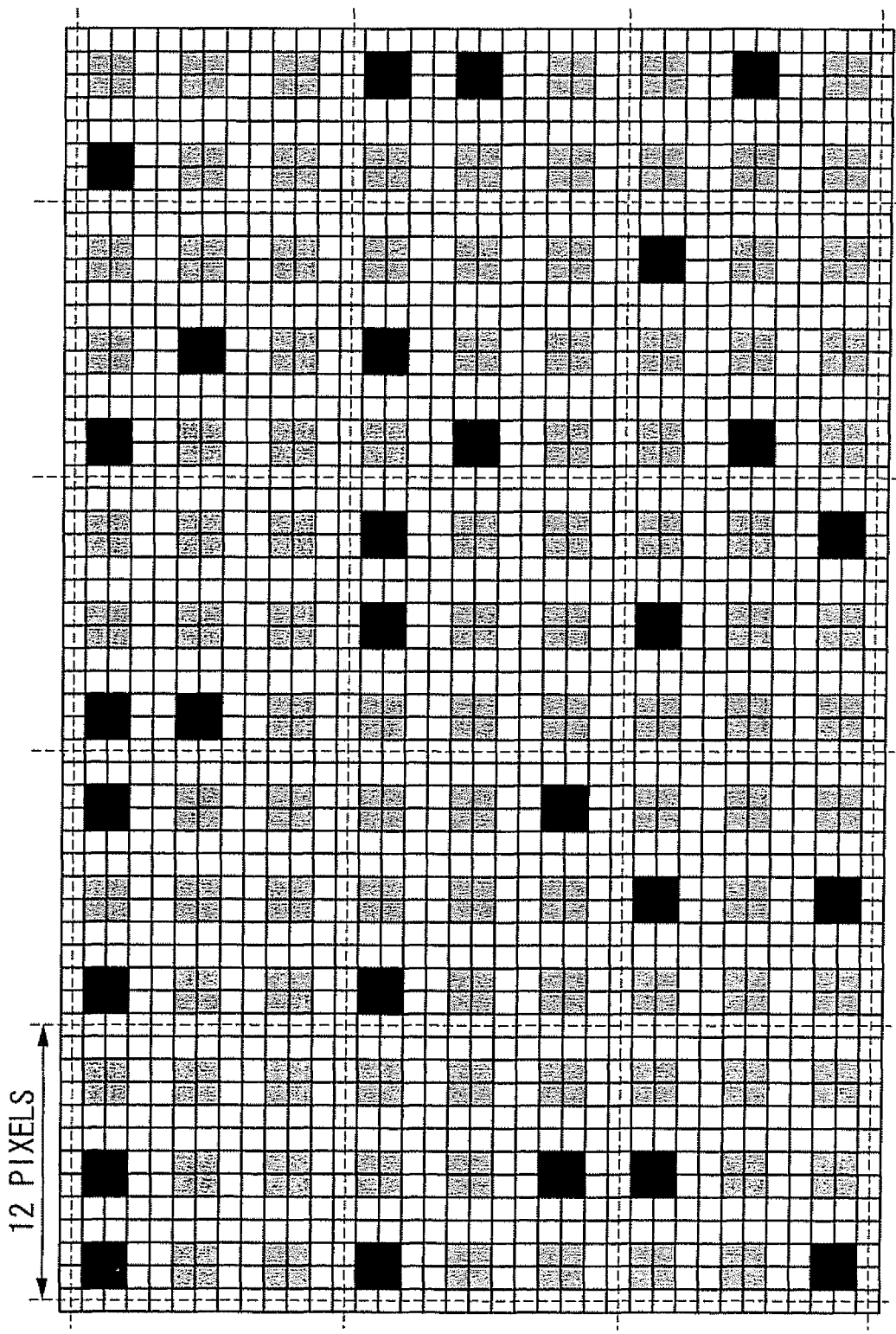
FIG. 3 is a partial enlarged diagram of a display surface of the electronic paper.

FIG. 3 is a partial enlarged diagram of the display surface of the electronic paper 10. On the display surface of the electronic paper 10, a number of code patterns representing the positional information are formed. Although the code patterns may be formed by visible ink and toner, they are preferably formed by invisible ink and toner, which absorb infrared and ultraviolet, so as not to damage an image quality of the displayed image.

Figure 4:
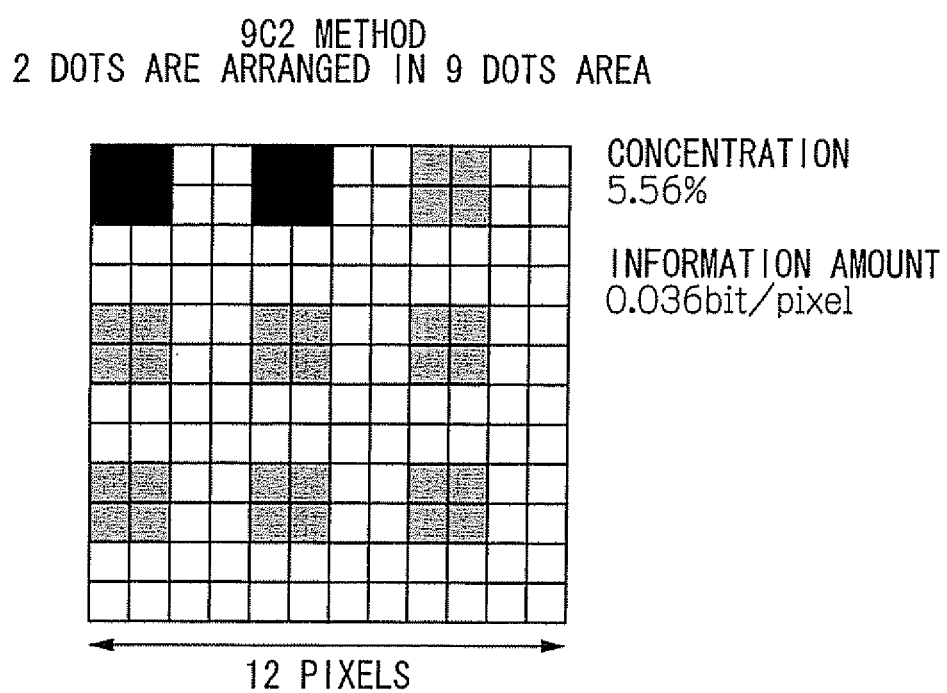
FIG. 4 is a diagram showing an example of the code patterns.

FIG. 4 is a diagram showing an example of the code patterns. In this example, the code pattern is provided with nine dots (printing area) in a block having a size of 12×12 pixels. Any two dots out of the nine dots are selected to display the information. Meanwhile, there are 36 combinations of two dots out of the nine dots, so that the base 2 logarithm is approximately 5.17 bits.

A gap of 2 pixels is provided between the printing areas. When printing with a 600 DPI printer, each dot is appropriately composed of 2×2 pixels. Although hereinafter, it will be described with this dot size, it is also possible to represent with another dot size, of course. In this code pattern, since two of 2×2 pixels=4 pixels are embedded in 12×12 pixels=144 pixels, a concentration in one block is 5.56%. Also, an information amount is 0.036 bits/pixel, which is obtained by dividing 144 by 5.17.

Figure 5:
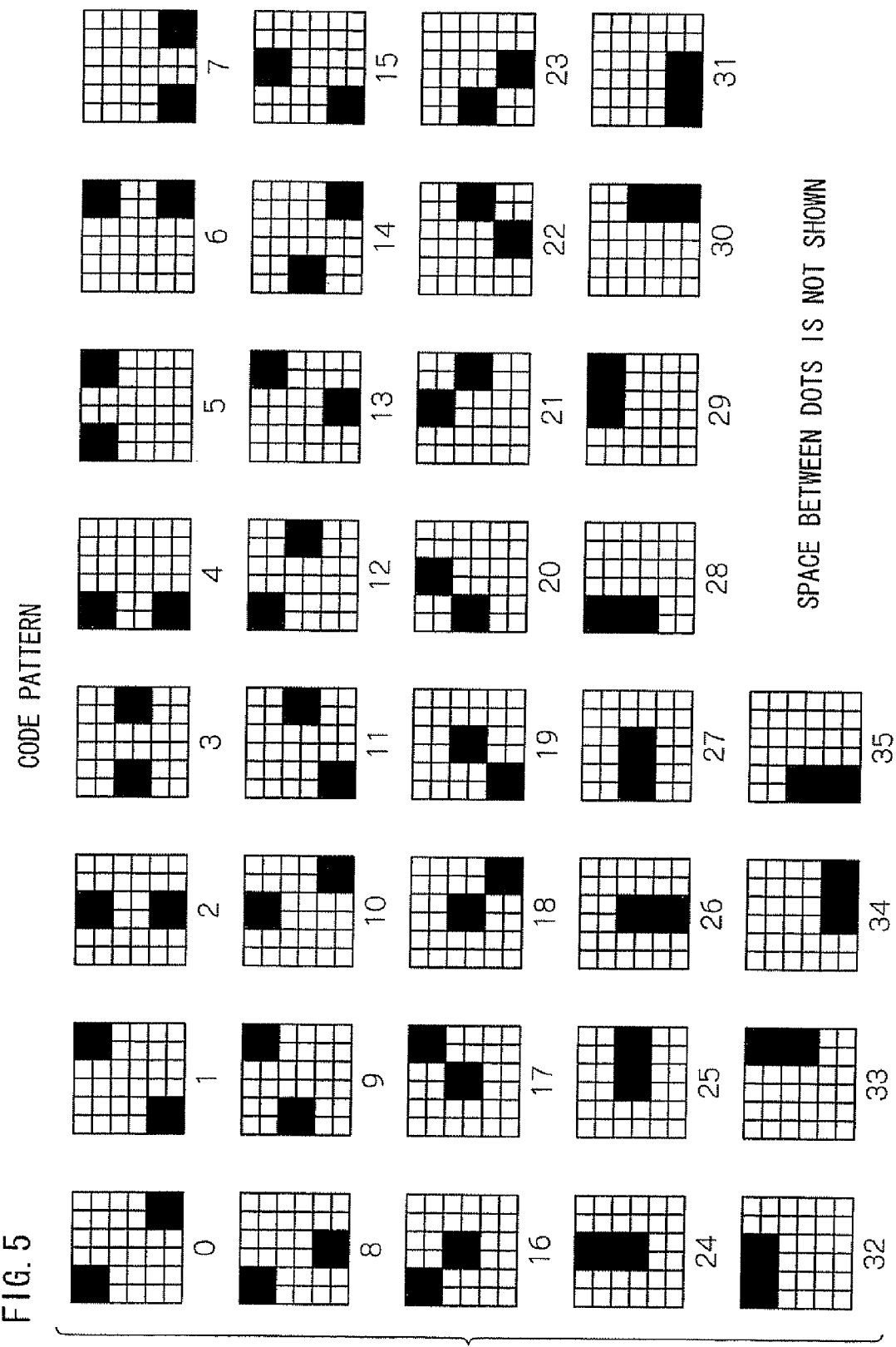
FIG. 5 is a diagram showing the code pattern shown in FIG. 4 and a pattern value.

FIG. 5 is a diagram showing the code pattern shown in FIG. 4 and a pattern value. In FIG. 5, the code pattern of the combination in which two out of nine dot printing areas are selected is shown. The number under the block indicates the pattern value shown by the pattern. Meanwhile, in FIG. 5, a margin shown in FIG. 4 is omitted. In addition, since the number of combinations in which two out of nine are selected is represented as "$_9C_2$" using a mathematical symbol hereinafter, this code pattern is referred to as a 9C2 pattern.

In the example shown in FIG. 3, a number of 9C2 patterns are formed on the display surface of the electronic paper 10. In this code pattern, by representing one piece of information by plural dots, it becomes undistinguished and the information amount may be increased. Also, as shown in FIG. 4, since the gap is provided between dots, it becomes possible to reduce an error in reading, thereby correctly reading the code patterns.

—Electronic Paper—

Figure 6:
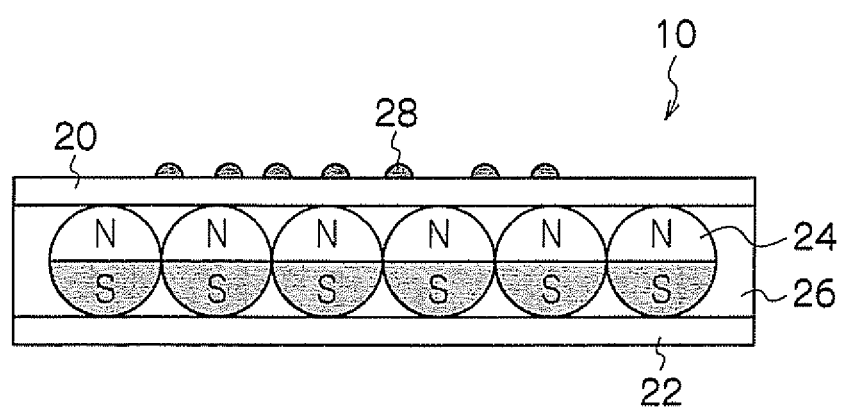
FIG. 6 is a partial cross-sectional diagram showing a schematic configuration of the electronic paper.
Figure 7A:
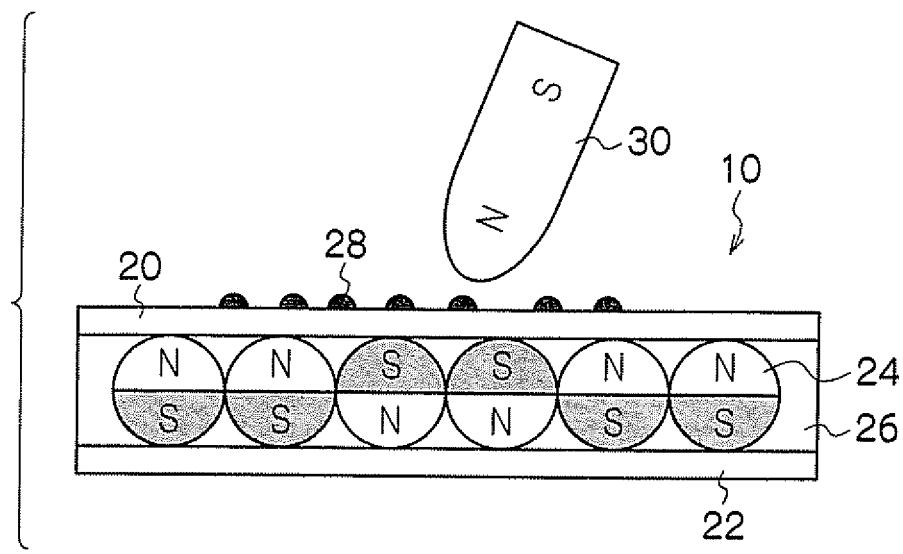
FIG. 7A is a diagram showing a state when the image is written on the electronic paper.
Figure 7B:
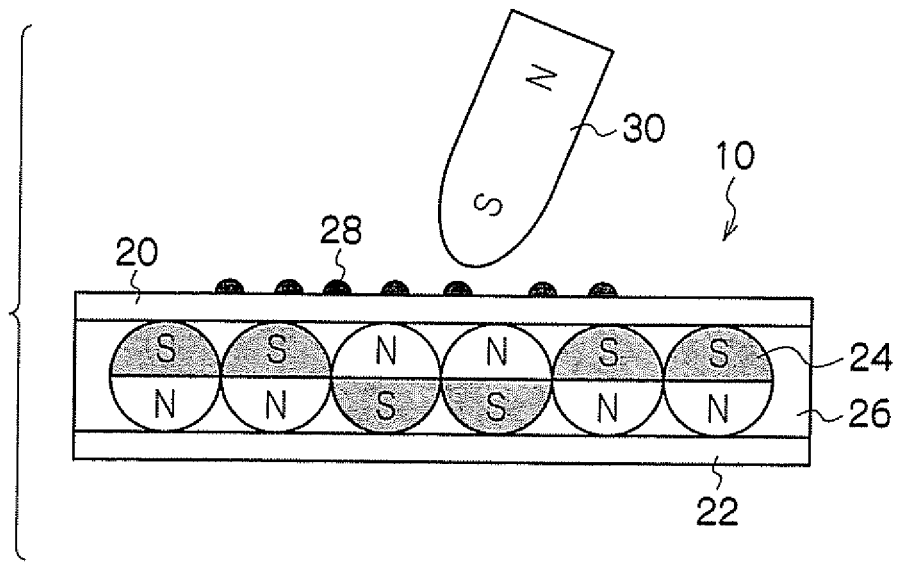
FIG. 7B is a diagram showing a state when the image is deleted from the electronic paper.

FIG. 6 is a partial cross-sectional diagram showing a schematic configuration of the electronic paper 10. Also, FIG. 7A is a diagram showing a state when the image is written on the electronic paper, and FIG. 7B is a diagram showing a state when the image is deleted.

The electronic paper 10 is provided with a transparent display substrate 20 and a rear surface substrate 22. The display substrate 20 is arranged so as to be opposed to the rear surface substrate 22 with a predetermined gap therebetween. Between the display substrate 20 and the rear surface substrate 22, a two-color rotating particle 24, which is colored half in black and half in white, and transparent liquid 26 are enclosed. In addition, as already described, on the surface of the display substrate 20, a number of code patterns 28 representing the positional information are formed.

The two-color rotating particle 24 is the particle, which is 10 to 100 μm in size, and of which magnetization state is different between two colors, such that for example, a white side is the north pole and a black side is the south pole. A magnetic axis is substantially perpendicular to a color boundary surface. When a magnetic field is applied to the electronic paper 10, a magnetized two-color rotating particle 24 rotates and any one of hemisphere surfaces faces to a side of the display substrate 20. A rotated state of a rotated two-color rotating particle 24 is maintained even after the magnetic field is released. By changing a polar character of the magnetic field to be applied, the other hemisphere surface faces to a side of the display substrate 20, thereby displaying a different color.

As shown in FIG. 6, when using the two-color rotating particle 24 in which the white side is the north pole and the black side is the south pole, the white side, which is magnetized to the north pole, of all of the two-color rotating particles 24 is directed to the display substrate 20 side, and the electronic paper 10 returns to the blank paper (non-display state). When handwritten input is performed with the stylus writing device 12, a magnet is put near the electronic paper 10 from the display substrate 20 side.

As shown in FIG. 7A, when putting the north pole of a magnet 30 closer to the electronic paper 10 from the display substrate 20 side, the black side, which is magnetized to the south pole, of the two-color rotating particle 24 faces to the display substrate 20 side, and a black image is displayed on a white background. As shown in FIG. 7B, when putting the south pole of the magnet 30 closer to the portion of the electronic paper 10 on which the black image is displayed, from the display substrate 20 side, the white side, which is magnetized to the north pole of the two-color rotating particle 24 faces to the display substrate 20 side and the black image is deleted.

—Printer-Type Writing Device—

Figure 8:
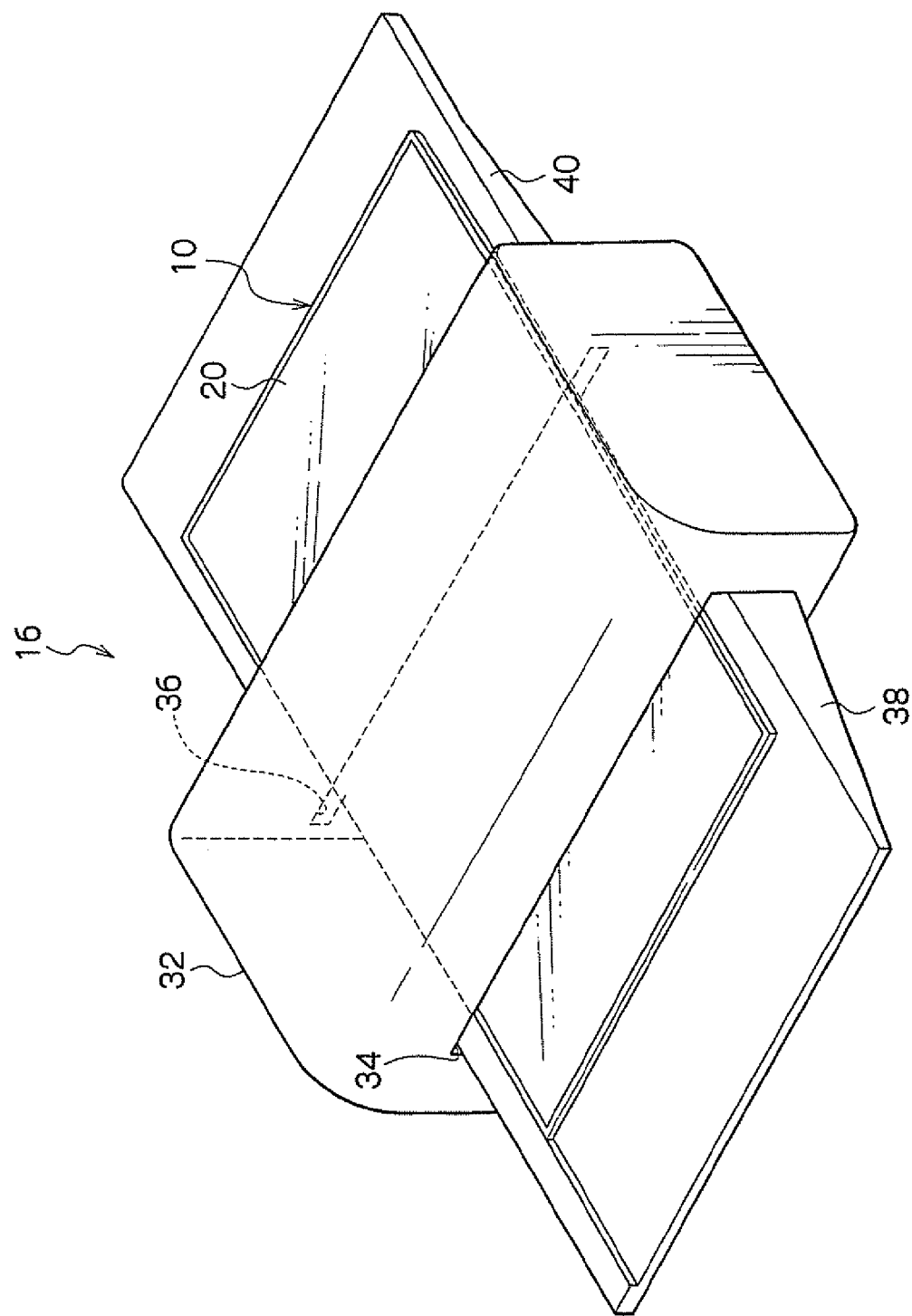
FIG. 8 is a perspective view showing an exterior appearance of a printer-type writing device.
Figure 9:
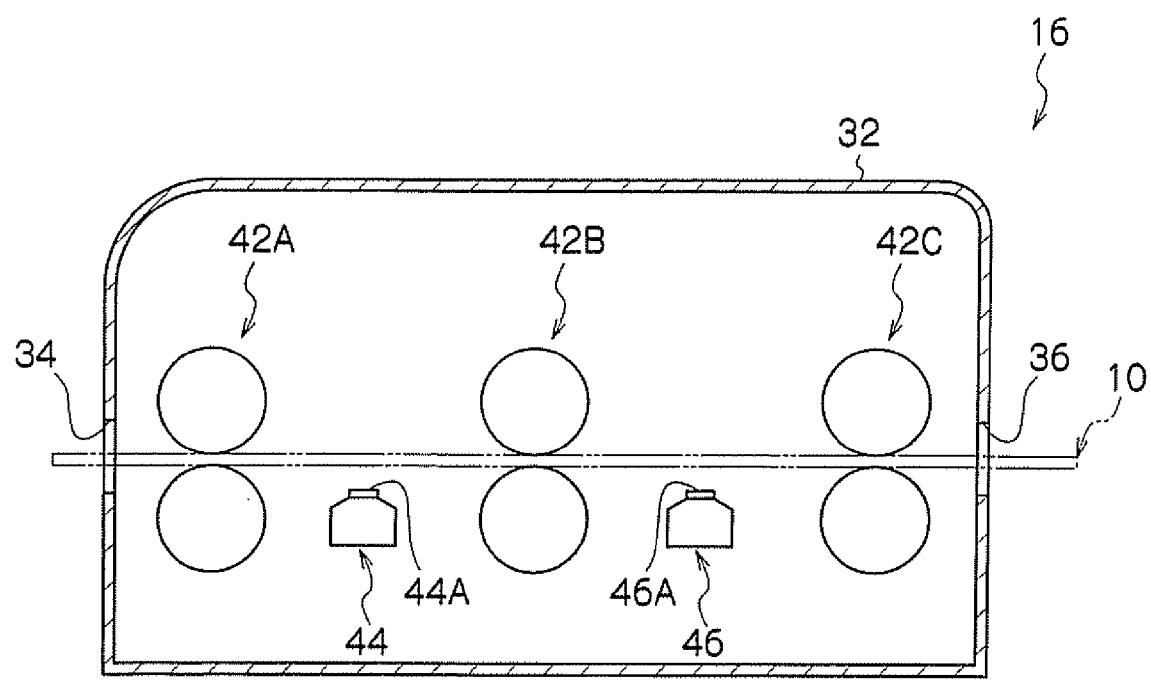
FIG. 9 is a schematic diagram showing a configuration of the writing device shown in FIG. 8.
Figure 10:
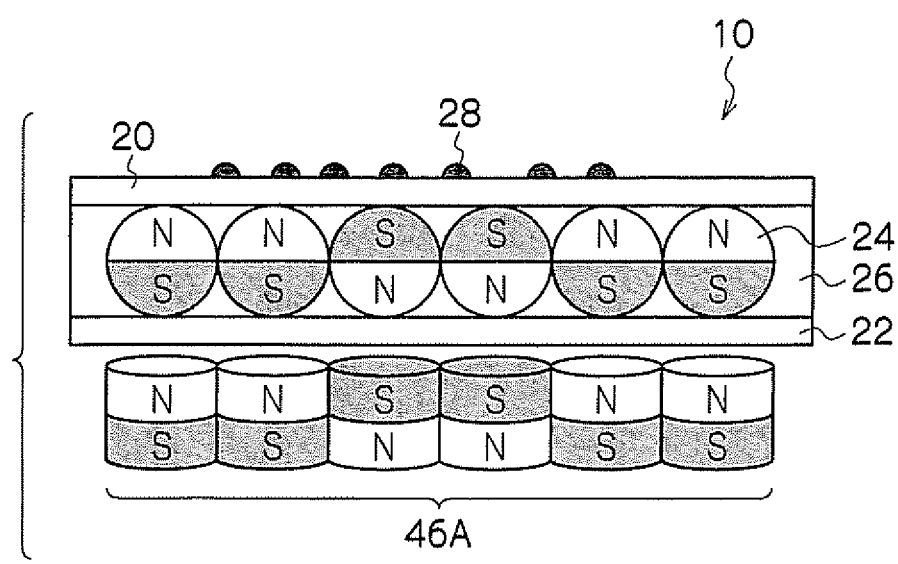
FIG. 10 is a schematic diagram showing a configuration of a magnetic recording head of the writing device shown in FIG. 8.

FIG. 8 is a perspective diagram showing an exterior appearance of the printer-type writing device 16. FIG. 9 is a schematic diagram showing a configuration of the writing device shown in FIG. 8. FIG. 10 is a schematic diagram showing a configuration of a magnetic recording head of the writing device shown in FIG. 9.

As shown in FIG. 8, the printer-type writing device 16 is provided with a casing 32. An insertion slot 34 is formed on one side surface of the casing 32, and a discharge slot 36 is formed on a side surface opposed thereto. The insertion slot 34 and the discharge slot 36 are formed in slit-shape such that the sheet-like electronic paper 10 may pass therethrough. On the casing 32, an insertion table 38 is provided on the insertion slot 34 side, and a discharge tray 40 is provided on the discharge slot 36 side. The electronic paper 10 is set on the insertion table 38 such that the display substrate 20 side faces upward of the drawing, and is inserted into the insertion slot 34.

As shown in FIG. 9, plural roller pairs 49, which are rotation driven at a predetermined rotation speed, are provided in the casing 32. In this example, three roller pairs 42A, 42B and 42C are provided, and they are collectively referred to as the roller pairs 42. By the roller pairs 42, a carrier path for guiding and carrying the electronic paper 10 is formed between the insertion slot 34 and the discharge slot 36. The electronic paper 10 inserted from the insertion slot 34 is drawn into the casing 32 by being sandwiched between the roller pair 42A, and after being carried within the casing 32 at a constant speed, this is sandwiched by the roller pair 42C and is sent on the discharge tray 40 from the discharge slot 36.

In addition, a delete head 44 provided with a number of magnets 44A is provided between the roller pairs 42A and 42B on the insertion slot 34 side in the casing 32. The delete head 44 is arranged on a lower portion of the carrier path of the electronic paper 10. The magnet 44A of the delete head 44 is directed to a side of the carrier path of the electronic paper 10. A number of magnets 44A are arranged in one-dimensional array so as to be opposed to an entire area in a width direction, which is a direction orthogonal to a carrying direction of the electronic paper 10.

When deleting by the printer-type writing device 16 at once, the magnet is put closer to the electronic paper 10 from the rear surface substrate 22 side. Herein, as shown in FIG. 6, the two-color rotating particle 24 in which the white side is the north pole and the black side is the south pole will be described. When deleting the image using the delete head 44, by putting the north pole of the magnet 44A of the delete head 44 closer to the rear surface substrate 22 side of the electronic paper 10, it is possible that the white side, which is magnetized to the north pole of all of the two-color rotating particles 24, is directed to the display substrate 20 side, thereby making the electronic paper 10 the blank paper (non-display state).

On the other hand, a magnetic recording head 46 provided with a number of magnets 46A of a pixel size is provided between the roller pairs 42B and 42C of the discharge slot 36 side. Each of the magnets 46A is an electric magnet of which magnetic pole is reversed by a direction of the current flowing through an inner coil. The magnetic recording head 46 is arranged on a lower portion of the carrier path of the electronic paper 10. The magnets 46A of the magnetic recording head 46 are directed to a side of the carrier path of the electronic paper 10. A number of magnets 46A are arranged in one-dimensional array so as to be opposed to the entire area in the width direction, which is a direction orthogonal to the carrying direction of the electronic paper 10.

When writing is performed by the printer-type writing device 16, the magnet is put closer to the electronic paper 10 from the rear surface substrate 22 side. Herein, as shown in FIG. 6, the two-color rotating particle 24 in which the white side is the north pole and the black side is the south pole will be described. When recording the image with the magnetic recording head 46, as shown in FIG. 10, the magnet 46A of the magnetic recording head 46 is magnetized to the south pole or the north pole depending on the image data input from the computer 14. Then, the magnetized magnetic 46A is put closer to the rear surface substrate 22 side of the electronic paper 10.

When the magnet 46A is magnetized to the south pole, the black side, which is magnetized to the south pole, of the two-color rotating particle 24 faces to display substrate 20 side, and a black pixel is formed. When the magnet 46A is magnetized to the north pole, the two-color rotating particle 24 does not rotate, and the white side, which is magnetized to the north pole, is kept facing to the display substrate 20 side, so that the white pixel is maintained. Thereby, the image depending on the image data is displayed on the electronic paper 10, and the displayed image is maintained.

—Stylus Writing Device—

Figure 11A:
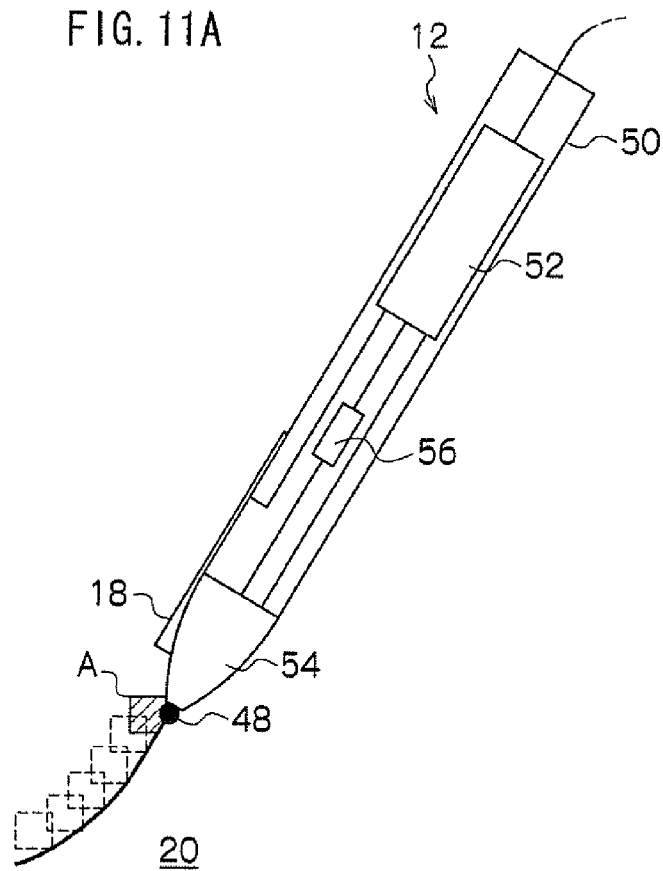
FIG. 11A is a schematic diagram showing a configuration of a stylus writing device.
Figure 11B:
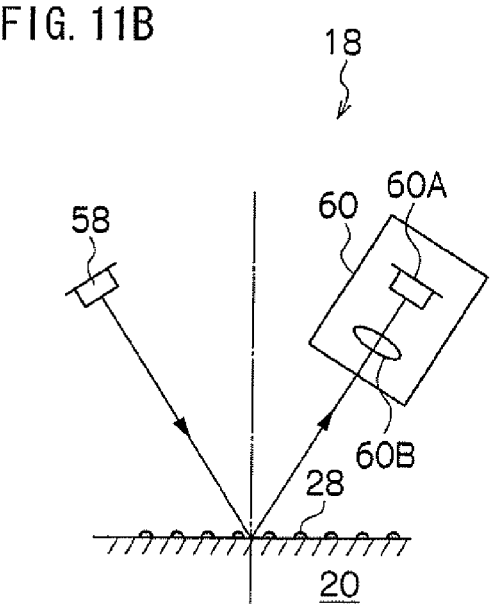
FIG. 11B is a schematic diagram showing a configuration of an optical sensor provided on the stylus writing device.

FIG. 11A is a schematic diagram showing a configuration of the stylus writing device 12, and FIG. 11B is a schematic diagram showing a configuration of the optical sensor 18 provided on the stylus writing device 12. The stylus writing device 12 is provided with a pen-shaped case 50. The optical sensor 18 is provided on a side portion of the case 50 in the vicinity of the end of the stylus (a penpoint) 48. In the case 50, a microprocessor 52, a magnetic recording head 54, and a pressure sensor 56 are embedded. The microprocessor 52 is connected to the optical sensor 18 and to the magnetic recording head 54. The pressure sensor 56 is connected to the magnetic recording head 54 and to the microprocessor 59.

The optical sensor 18 is formed of a light source 58 for illuminating light to the display substrate 20 of the electronic paper 10 and an imaging unit 60 for taking an image of the surface of the display substrate 20. The light source 58 is formed of a light-emitting device such as an LED. Also, the imaging unit 60 is formed of an imaging device 60A such as a CCD and an imaging optical system 60B including a lens. For example, when using an infrared LED as the light source 58, the imaging device such as a CMOS sensor and a CCD sensor having sensitivity in an infrared area as the imaging devices 60A is used.

Figure 14:
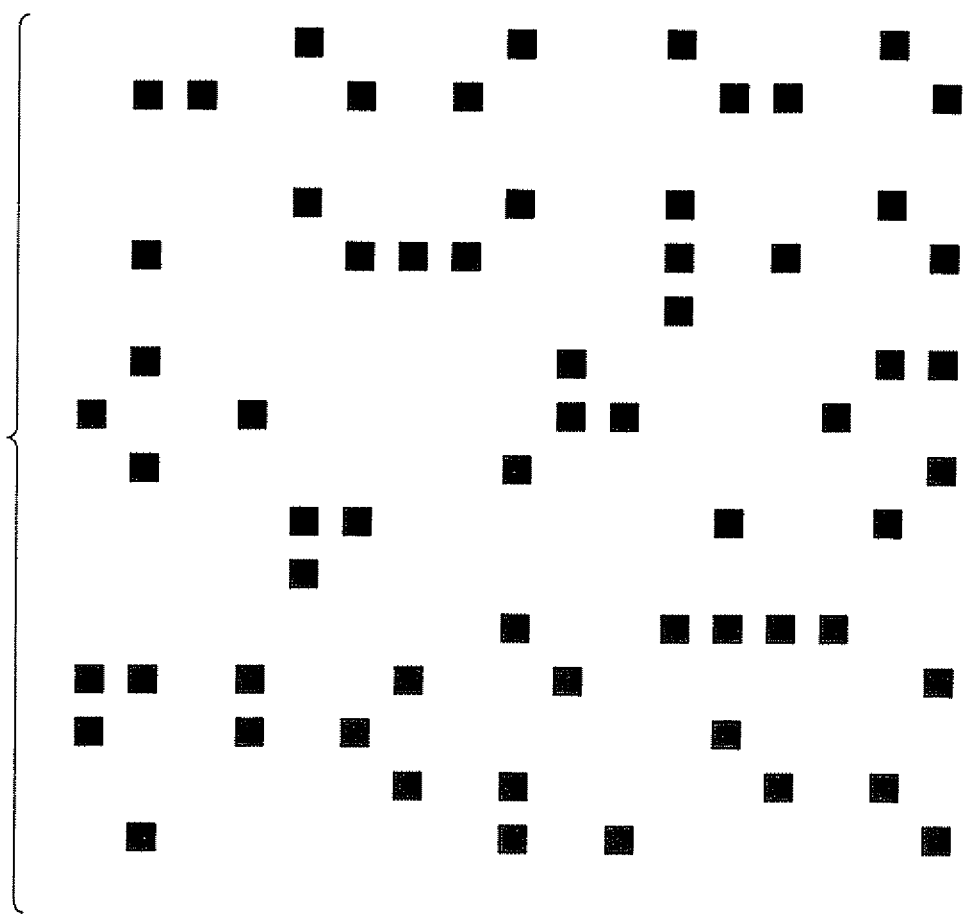
FIG. 14 is a diagram showing an image read by the optical sensor.

With this configuration, the optical sensor 18 takes an image of the display surface in the vicinity of the penpoint 48 every predetermined time while performing the handwritten input and optically reads the code pattern in the predetermined imaging area. For example, in FIG. 11A, a shaded area A is set as the imaging area. When using the above-described 9C2 pattern (refer to FIG. 4) as the code pattern, the image as shown in FIG. 14 is taken by the optical sensor 18.

The microprocessor 52 is provided with a CPU, a ROM, a RAM and an input/output port for connecting to an external device. The CPU, ROM, RAM and input/output port are connected to one another through a bus. A control program stored in the ROM is read by the RAM, which is a work area, and is executed. The CPU operates based on the program read by the RAM. The control program for executing a decoding process of the code pattern is stored in the ROM. With this configuration, the microprocessor 52 decodes the code pattern read by the optical sensor 18 and obtains the positional information of the penpoint one after another. A decoding process of the code pattern will be described later.

The pressure sensor 56 detects whether the penpoint 48 of the stylus writing device 12 contacts the display surface of the electronic paper 10 (pen-down) or not by the pressure. When the penpoint 48 contacts the display surface, the pressure applied to the penpoint 48 is transmitted to a pressure sensor 56. The pressure sensor 56 senses the pressure and inputs a pen-down signal to the microprocessor 52. When the pen-down signal is input to the microprocessor 52, this starts supplying the electric power to the magnetic recording head 54 and starts the decoding process of the code pattern.

Figure 12A:
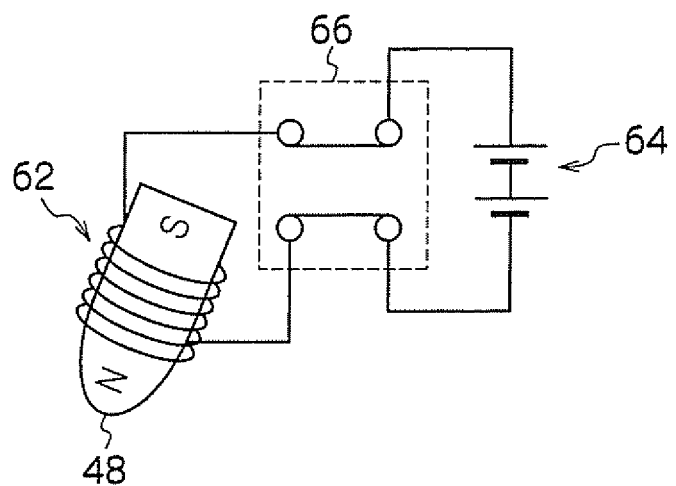
FIG. 12A is a diagram showing a magnetic recording head of the stylus writing device performing a writing operation.
Figure 12B:
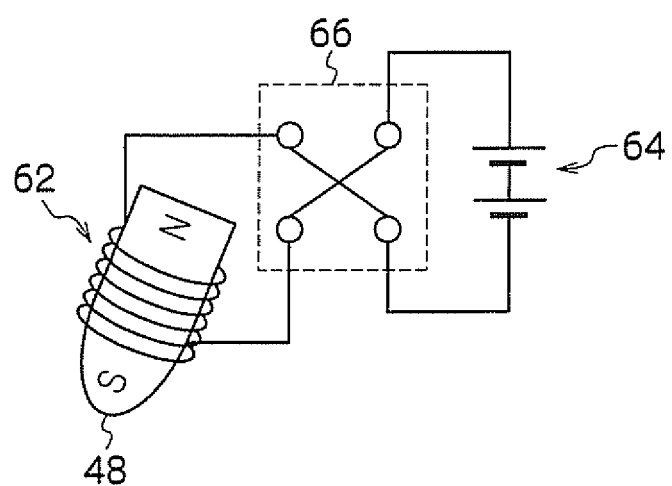
FIG. 12B is a diagram showing a magnetic recording head of the stylus writing device performing a deleting operation.

FIG. 12A is a diagram showing the magnetic recording head 54 of the stylus writing device 12 performing a writing operation, and FIG. 12B is a diagram showing a magnetic recording head of the stylus writing device performing a deleting operation. The magnetic recording head 54 is provided with a coil 62 formed by coiling a conducting wire around a core, a power source 64 for applying direct current to the coil 62 and a switch 66 for switching a direction of the current. When applying the direct current from the power source 64 to the coil 62, the coil 62 becomes a magnet (electric magnet) due to electromagnetic induction. Therefore, a tip end portion of the core of the coil 62 becomes the penpoint 48 of the stylus writing device 12. Meanwhile, the power source 64 is turned on when the pressure sensor 56 detects the pen-down by a switch not shown.

A direction of a magnetic field of the coil 62 is decided by the direction of the current. When switching the direction of the current flowing into the coil 62 by the switch 66, a magnetic pole of the penpoint 48 switches from the south pole to the north pole. For example, as shown in FIG. 6, when using the two-color rotating particle 24 in which the white side is the north pole and the black side is the south pole, the magnetic pole of the penpoint 48 is set to the north pole and the writing is performed by putting the penpoint 48 closer to the electronic paper 10 from the display substrate 20 side, as shown in FIG. 12A, and the magnetic pole of the penpoint 48 is set to the south pole and the image is deleted by putting the penpoint 48 closer to the electronic paper 10 from the display substrate 20 side, as shown in FIG. 12B.

Figure 13A:
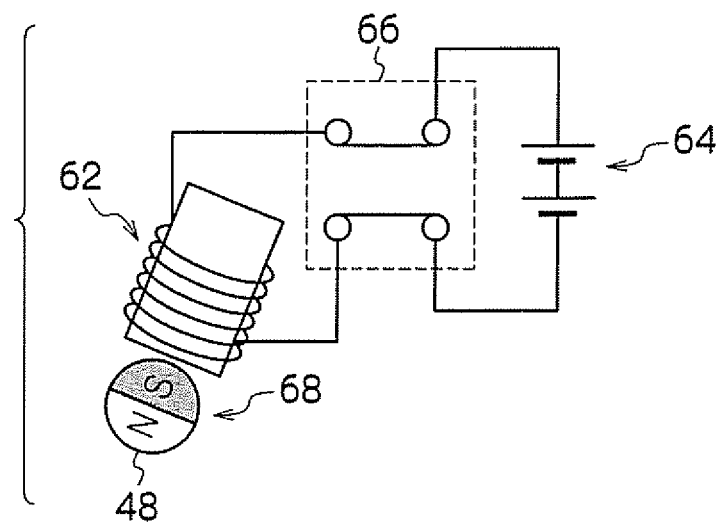
FIGS. 13A and 13B are diagrams each showing another example of the magnetic recording head of the stylus writing device.

FIGS. 13A and 11B are diagrams each showing another example of the magnetic recording head of the stylus writing device. In this example, the magnetic recording head 54 is provided with the coil 62 formed by coiling the conducting wire around the core, the power source 64 for applying the direct current to the coil 62, the switch 66 for switching the direction of the current, and a permanent magnet 68 arranged in the vicinity of the tip end portion of the core of the coil 62.

The permanent magnet 68 is a spherical permanent magnet having hemispheres of different magnetisms such as one hemisphere of the north pole and the other hemisphere of the south pole. The spherical permanent magnet 68 is rotatably retained on the penpoint 48 of the stylus writing device 12 by a retention member not shown. When applying the direct current from the power source 64 to the coil 62, the coil 62 becomes the magnet (electric magnet) due to the electromagnetic induction to rotate the spherical permanent magnet 68.

Figure 13B:
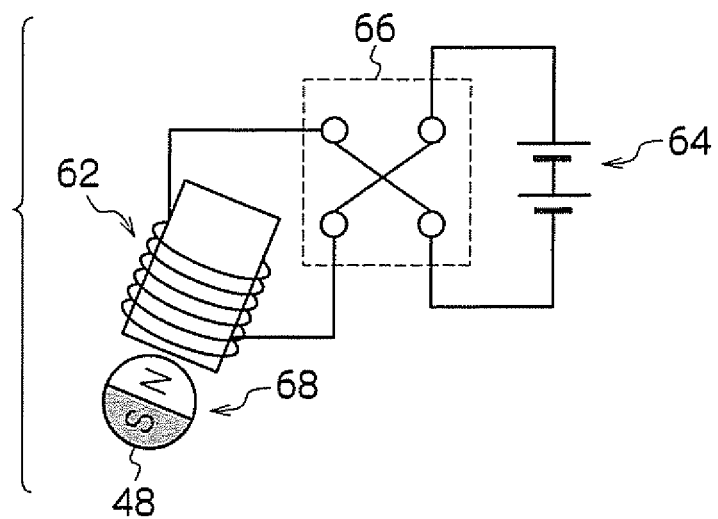

When the direction of the current flowing into the coil 62 is switched by the switch 66, the magnetic pole of the penpoint 48 switches from the south pole to the north pole. For example, as shown in FIG. 13A, when the magnetic pole of the tip end portion of the core of the coil 62 is set to the north pole, the permanent magnet 68 rotates such that the south pole side faces to the core, and the magnetic pole of the penpoint 48 becomes the north pole. Also, as shown in FIG. 13B, when the magnetic pole of the tip end portion of the core of the coil 62 is set to the south pole, the permanent magnet 68 rotates such that the north pole side faces to the core and the magnetic pole of the penpoint 48 becomes the south pole. In this manner, when utilizing the rotation of the permanent magnet 68, the power supply 64 may be turned on only when rotating the permanent magnet 68, so that power consumption may be reduced.

Also, in this exemplary embodiment, the microprocessor 52 is connected to the computer 14. By connecting the microprocessor 52 to the computer 14, data accumulated in the same may be output to the computer 14. Meanwhile, although the microprocessor 52 and the computer 14 are connected by wired connection with a cable through an interface in this exemplary embodiment, as shown in FIG. 1 or the like, it is possible to wirelessly communicate with the computer 14. In addition, a power supply for supplying the electric power to the stylus writing device 12, a switch for turning on and off the power supply, and a switch for switching writing/deleting are not shown.

—Decoding Method of Code Pattern—

Next, a decoding method of the code pattern will be described.

The optical sensor 18 of the stylus writing device 12 takes the image of the display surface in the vicinity of the penpoint 48 every predetermined time, while performing the handwritten input, and optically reads the code pattern in the predetermined imaging area. The image data read by the optical sensor 18 is input to the microprocessor 52. The microprocessor 52 decodes the code pattern by following procedure, thereby obtaining the positional information of the penpoint.

Figure 15:
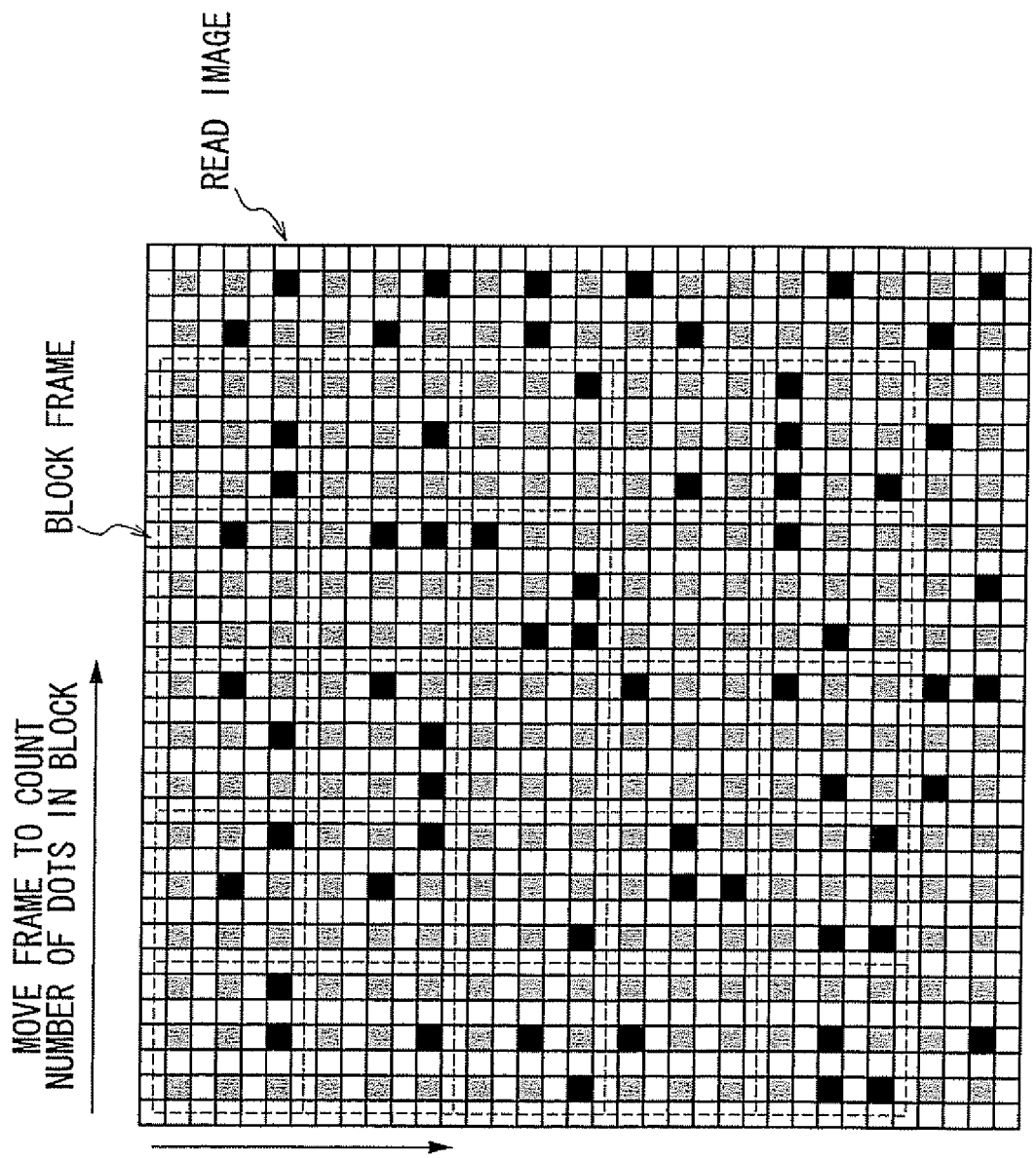
FIG. 15 is a diagram showing a state of overlapping a block frame with a dot pattern.
Figure 16:
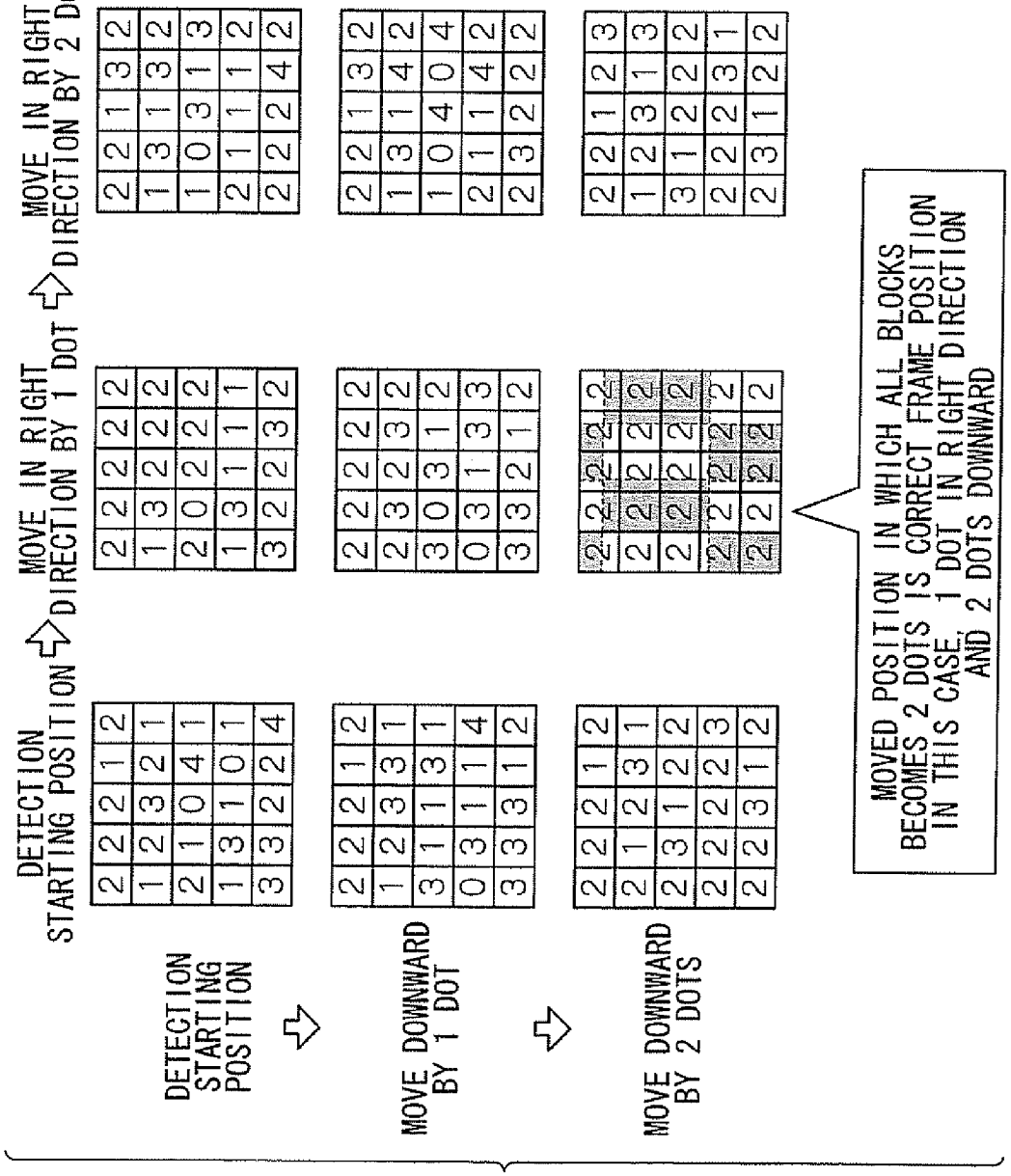
FIG. 16 is a diagram showing a procedure of detecting a boundary of blocks by moving the block frame.
Figure 17A:
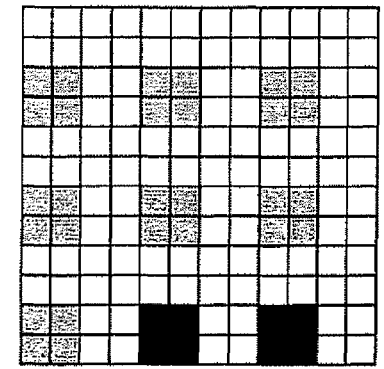
FIG. 17A-17D are diagrams each showing a synchronous code pattern.
Figure 17B:
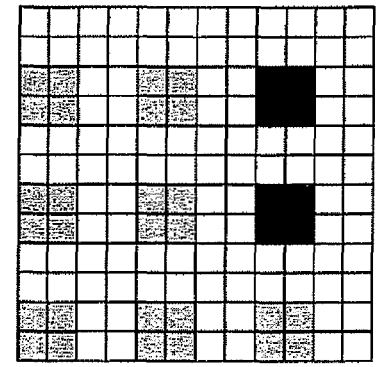
Figure 17C:
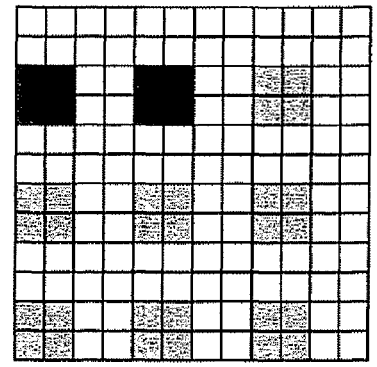
Figure 17D:
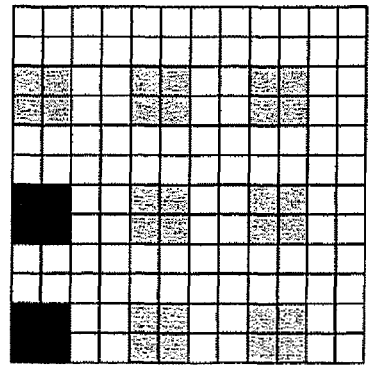

First, as shown in FIG. 15, a block frame is overlapped with the read image and boundaries of the blocks are detected. The block frame is the minimum unit, which is necessary when decoding embedded information, and the frame of 5×5 blocks is used in this exemplary embodiment. As shown in FIG. 16, a position at which the number of dots printed in each block is 2 is searched by moving the block frame. As shown in FIG. 16, the block frame is moved right and downward line by line from a position at which the detection is started and the position at which the number of dots in the blocks is 2 is detected. The detailed process will be described later.

Next, a synchronous code included in the code pattern is detected. By the synchronous code, a direction of the code pattern and a reference point when decoding the information in the block are judged. FIGS. 17A to 17D are diagrams showing the code patterns of the synchronous code. As the synchronous code, patterns of which pattern values are 32 to 35 out of the code patterns shown in FIG. 5 are used. As shown in FIGS. 17A to 17D, the code patterns of which pattern values are 32 to 35 are such that when any one of the patterns is selected, other three patterns of the code patterns having pattern values of 32 to 35 correspond to the pattern obtained by rotating the selected pattern by 90 degrees, 180 degrees, and 270 degrees, respectively. Similarly, combinations of the code patterns having pattern values of 4 to 7, 8 to 11, 12 to 15, 16 to 19, 20 to 23, 24 to 27, and 28 to 31 may also be used.

Next, the direction of the code pattern is corrected by the synchronous code. For example, as shown in FIG. 18, any one of the synchronous codes having pattern values of 32 to 35 is put at a predetermined position of the above-described block frame of 5×5 blocks. Herein, an example in which the synchronous code having the pattern value 32 is inserted in a left upper portion of the 5×5 blocks is described. Herein, for example, as shown in FIG. 18, when the synchronous code having the pattern value 35 is detected from the read image, the image is rotated by 90 degrees in a right direction in order to convert the code pattern having the pattern value 35 to the code pattern having the pattern value 32. The code pattern having the pattern value 35 is the image obtained by rotating the code pattern having the pattern value 32 by 270 degrees in the right direction, as shown in FIG. 17. Thereby, it becomes possible to decode the information in a correct direction.

Figure 19:
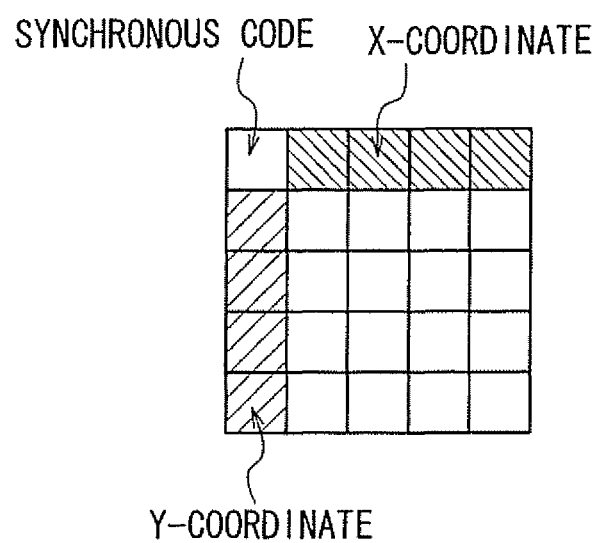
FIG. 19 is a diagram showing an arrangement of the code pattern in the block frame.

Next, the code pattern is decoded from the code pattern in the block frame and the positional information of the pen-point is obtained. FIG. 19 is a diagram showing an example of arrangement of the code patterns in the block frame. In the block frame, the code pattern of the synchronous code and the code pattern representing a coordinate value on the display surface of the electronic paper 10 are embedded. In FIG. 19, an example of basic arrangement of the code patterns is shown. The code pattern representing the x-coordinate on the page is a line including the synchronous code and is recorded in the blocks, which go abreast in an x-axis direction. Similarly, the code pattern representing the y-coordinate is a line including the synchronous code and is recorded in the blocks, which go abreast in a y-axis direction. The basic configuration is arranged on an entire display surface of the electronic paper 10.

A sequence, which is called as an M sequence over the entire display surface of the electric paper 10, is used as the x-coordinate and the y-coordinate. The M sequence is the sequence having a cycle of a certain length, and a partial sequence does not conform to other partial sequences. By utilizing this nature, a position of the partial sequence in the entire sequence may be specified. When a length of the partial sequence is set n, the length of the entire sequence is represented as 2n−1. Herein, the entire sequence represents the entire display surface, and the partial sequence selects the sequence represented by the number of block of the basic configuration.

When decoding the x-coordinate, the block of the line including the synchronous code is read while skipping the synchronous code. Also, when decoding the y-coordinate, the block of the line including the synchronous code is read while skipping the synchronous code. By reading in this order, it becomes possible to decode the x-coordinate and the y-coordinate.

—Decoding Process Function of Stylus Writing Device—

Figure 20:
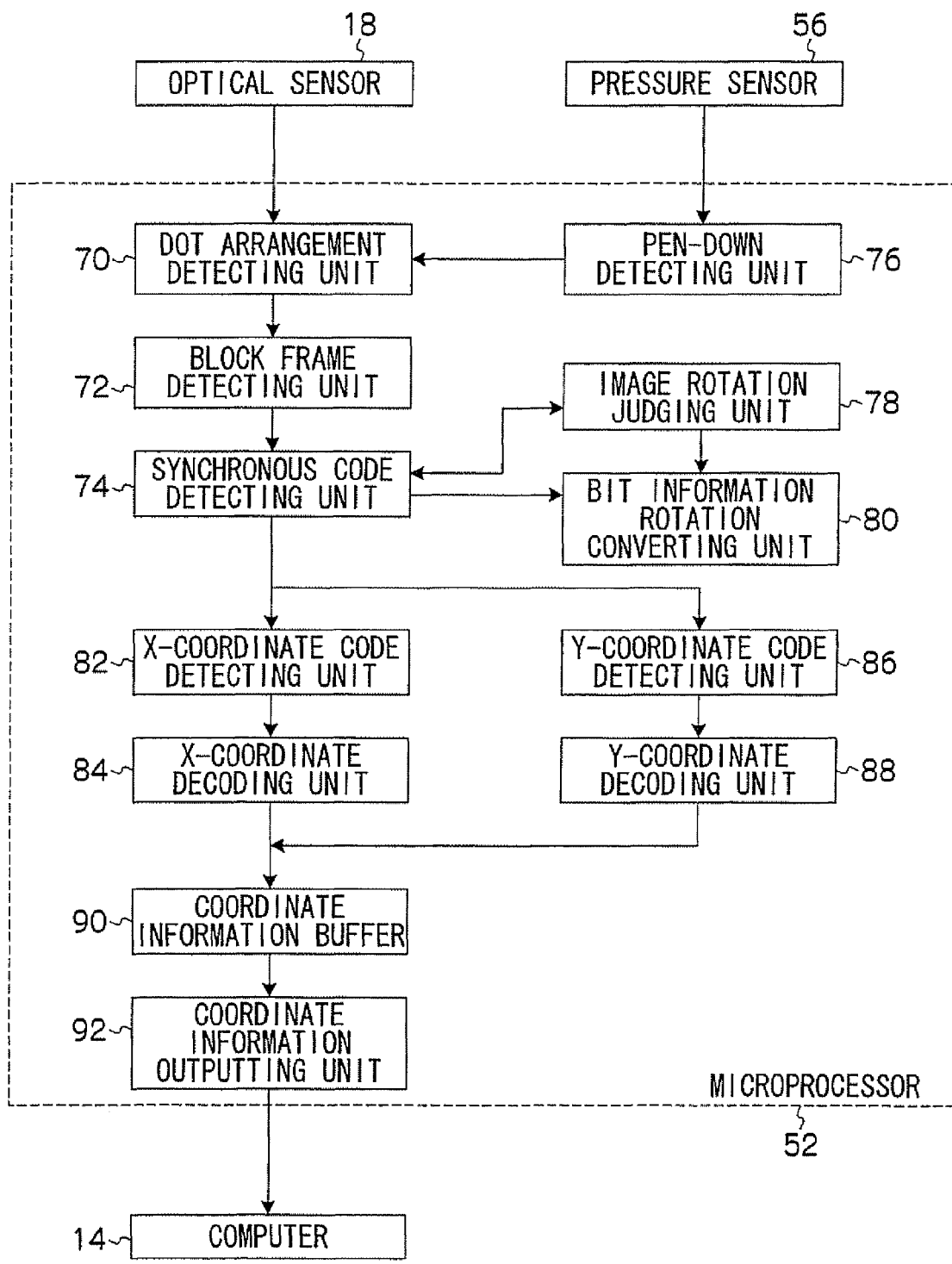
FIG. 20 is a functional block diagram showing a configuration of a microprocessor mounted on the stylus writing device.

FIG. 20 is a functional block diagram showing a configuration of the microprocessor 52 mounted on the stylus writing device 12. The microprocessor 52 is provided with a dot arrangement detecting unit 70, a block frame detecting unit 72, a synchronous code detecting unit 74, a pen-down detecting unit 76, an image rotation judging unit 78, a bit information rotation converting unit 80, an x-coordinate code detecting unit 82, an x-coordinate decoding unit 84, a y-coordinate code detecting unit 86, a y-coordinate decoding unit 88, a coordinate information buffer 90 and a coordinate information output unit 92.

The image data read by the optical sensor 18 of the stylus writing device 12 is input to the dot arrangement detecting unit 70 of the microprocessor 52. Also, when the pen-down is detected by the pressure sensor 56 of the stylus writing device 12, the pen-down signal is input to the pen-down detecting unit 76 of the microprocessor 52. The pen-down detecting unit 76 confirms the input of the pen-down signal when the input of the pen-down signal is confirmed, the dot arrangement detecting unit 70 detects the dot from the read image data, and records the coordinate value of the dot in the memory, such as the RAM. In the memory, dot arrangement, which is the arrangement information of the dot, is stored.

The block frame detecting unit 72 overlaps the block frame with the dot arrangement developed in the memory, and adjusts the position of the block frame such that the number of dots in each block is 2. The synchronous code detecting unit 74 detects the synchronous code. The image rotation judging unit 78 judges the rotation of the image. The bit information rotation converting unit 80 rotates the code pattern by a rotation angle detected in the image rotation judging unit 78, and sets the code pattern in the correct direction.

The x-coordinate code detecting unit 82 detects the code pattern representing the x-coordinate. The x-coordinate decoding unit 84 decodes the code pattern of the x-coordinate. The y-coordinate code detecting unit 86 detects the code pattern representing the y-coordinate. The y-coordinate decoding unit 88 decodes the code pattern of the y-coordinate. The coordinate information buffer 90 temporarily stores data of the decoded x-coordinate and y-coordinate (coordinate information) in the memory such as the RAM. The coordinate information outputting unit 92 outputs the coordinate information stored in the coordinate information buffer 90 to the computer 14 as the handwritten input data.

—Synthesizing Process of Handwritten Input Images—

Next, the synthesizing process of the handwritten input images performed by the computer 14 will be described.

Figure 21:
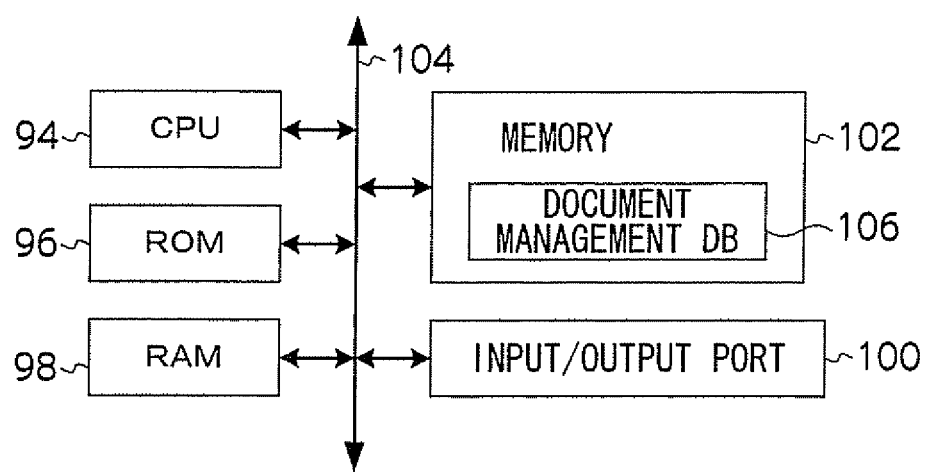
FIG. 21 is a block diagram showing a configuration of a computer.

The computer 14 is provided with a CPU 94, a ROM 96, a RAM 98, an input/output port 100, and a memory 102, as shown in FIG. 21. The CPU 94, the ROM 96, the RAM 98, the input/output port 100 and the memory 102 are connected to one another through a bus 104. A control program stored in the ROM 96 is read by the RAM 98, which is a work area, and is executed. The CPU 94 operates based on the control program read by the RAM 98. The control program for executing the synthesizing process of the handwritten input images is stored in the ROM 96.

The memory 102 is provided with a document management database 106 for managing the document data. When the handwritten input is performed on the document image displayed on the electronic paper 10, the handwritten input data is related to the original document data by page identification information (page ID) or the like, and is stored in the document management database 106. By these configurations, the computer 14 performs the image processing to synthesize the document image and the handwritten input image. Then, the synthesized image is written on the electronic paper 10 by the printer-type writing device 16, thereby displaying the overwritten image again.

Figure 22:
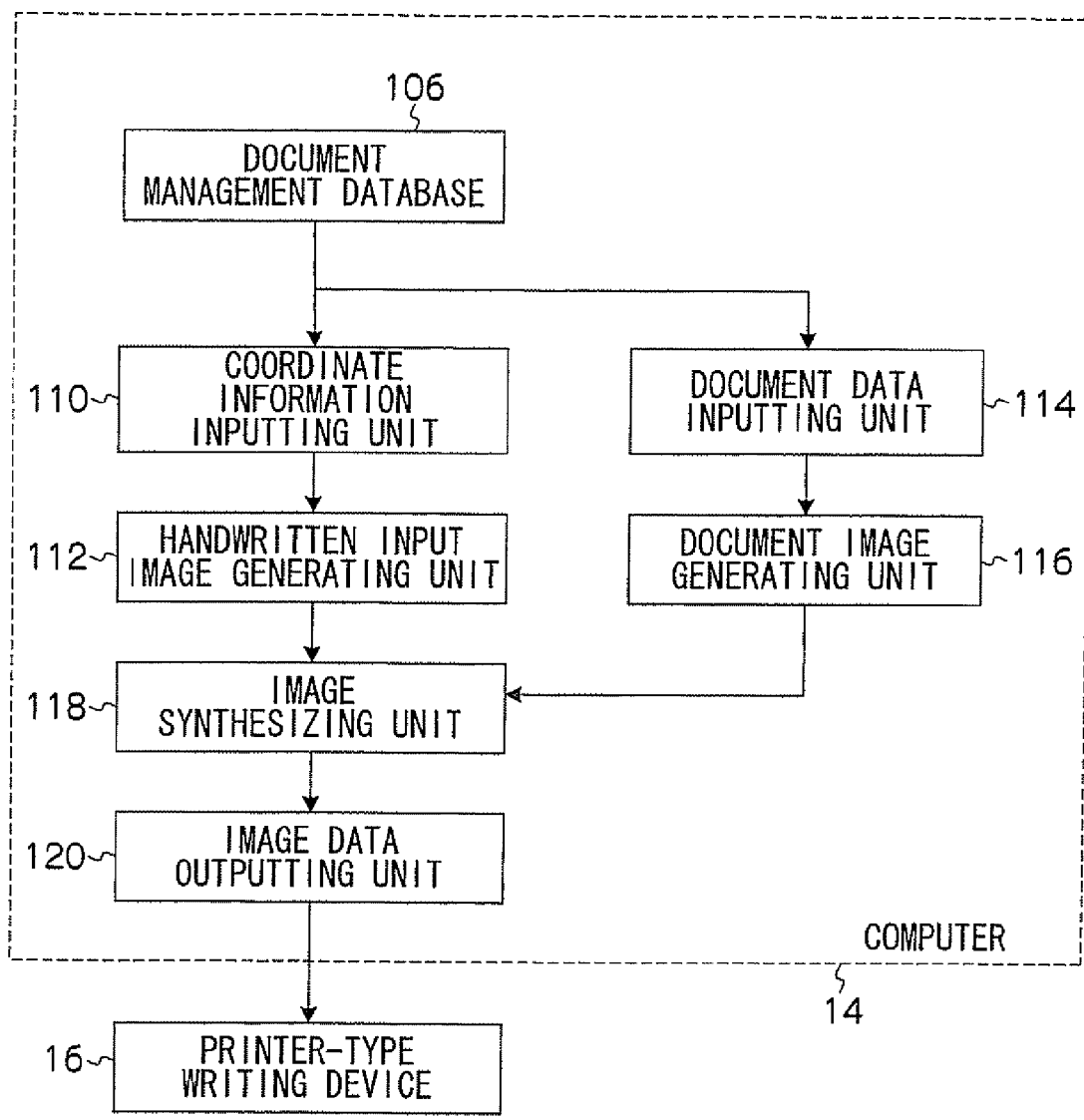
FIG. 22 is a functional block diagram when the computer functions as an image processing device.

FIG. 22 is a functional block diagram when the computer 14 functions as the image processing device. The computer 14 is provided with a coordinate information inputting unit 110, a handwritten input image generating unit 112, a document data inputting unit 114, a document image generating unit 116, an image synthesizing unit 118 and an image data outputting unit 120.

The coordinate information inputting unit 110 outputs the handwritten input data (coordinate information of the x-axis and the y-axis on the display surface of the electronic paper 10) related to the document data to the handwritten input image generating unit 112. The handwritten input image generating unit 112 performs the raster development of the handwritten input data to generate the image data of one page and outputs the generated image data to the image synthesizing unit 118. Also, the document data inputting unit 114 outputs the document data to be displayed on the electronic paper 10 to the document image generating unit 116. The document image generating unit 116 performs the raster development of the document data to generate the image data of one page and outputs the generated image data to the image synthesizing unit 118.

The image synthesizing unit 118 generates the image data by overlapping the image data input from the document image generating unit 116 with the image data input from the handwritten input image generating unit 112. The image data outputting unit 120 outputs the image data to the printer type writing device 16 with the print instruction. Thereby, in the printer-type writing device 16, the writing to the electronic paper 10 is performed depending on the image data. Thereby, the overwritten image obtained by synthesizing the handwritten input image on the document image is displayed on the electronic paper 10.

—Modified Example of Display Method—

Although the example to write on the electronic paper of so-called a "magnetic twist ball method" in which the two-color rotating particle, which is colored in white and black, rotates due to the application of the magnetic field to display the black and white image, has been described in the above-described exemplary embodiment, the electronic paper is not limited to the magnetic twist ball method. The invention may be applied to the electronic paper of any display method, as long as the display method has no obstacle in optically reading the code pattern on the display surface.

As another display method, there are, for example, "electrophoretic method" in which the image is displayed by enclosing dispersion liquid and charged particle between a pair of substrates and electrophoresing the charged particle by applying the voltage; "magnetophoretic method" in which the image is displayed by enclosing the dispersion liquid and the magnetic particle between a pair of substrates and magnetophoresing the magnetic particle by applying the magnetic field to display the image; and "electric twist ball method" in which the black and white image is displayed by controlling the direction of the rotating particles, which is colored half in white and half in black, by the electric field.

In addition, although the example in which the image is displayed by rotating the two-color rotating particles by applying the magnetic field and thereafter the writing (overwriting) is performed by rotating the same two-color rotating particles by applying the magnetic field again has been described in the above-described exemplary embodiment, the overwriting may be performed by a display method, which is different from that for displaying the display image. When overwriting is performed by a different display method, the original display image is not damaged.

For example, it is possible to display the image by enclosing the dispersion liquid, the charged particle and the magnetic particle between a pair of substrates and magnetophoresing the magnetic particle by applying the magnetic field, and thereafter, overwrite a different image on the display image by electrophoresing the charged particle by applying the electric field. Similarly, it is possible to display the image by electrophoresing the charged particle by applying the electric field, and thereafter, overwrite the different image on the display image by magnetophoresing the magnetic particle by applying the magnetic field.

In the method to display the image by electrophoresing the charged particle by applying the electric field, it is possible to display the color image by using the charged particle of three primary colors, that is, red, blue and yellow, of which voltages necessary for traveling are different to one another. Also, at the same time, it is possible to overwrite on the displayed color image by using the two-color rotating particle rotating by applying the magnetic field.

Figure 23:
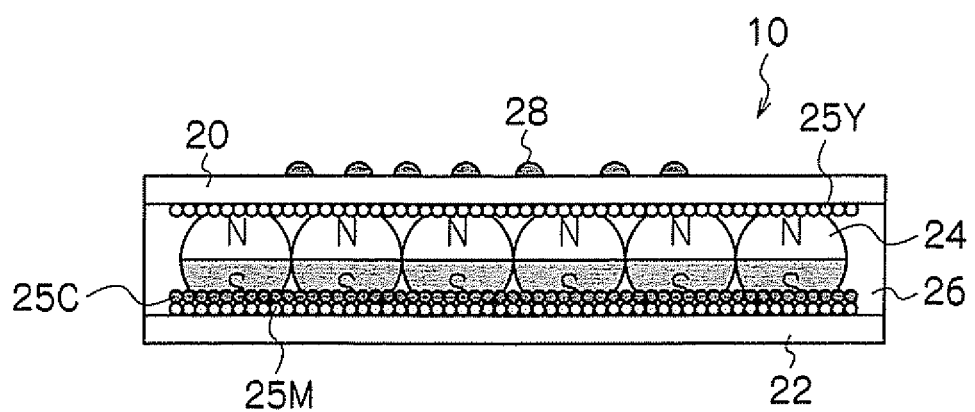
FIG. 23 is a partial cross-sectional diagram showing a schematic configuration of the electronic paper capable of overwriting to the colored image.
Figure 24A:
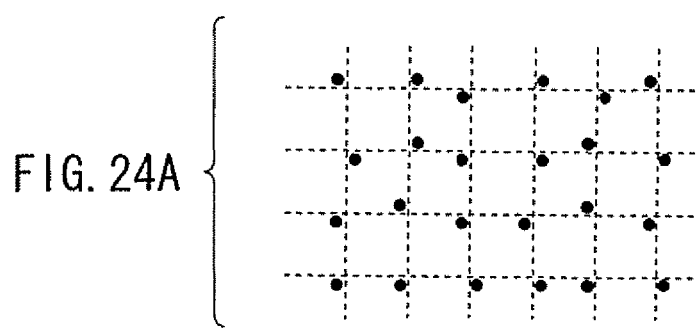
FIG. 24A-24D are diagrams each showing another example of the code pattern.
Figure 24B:
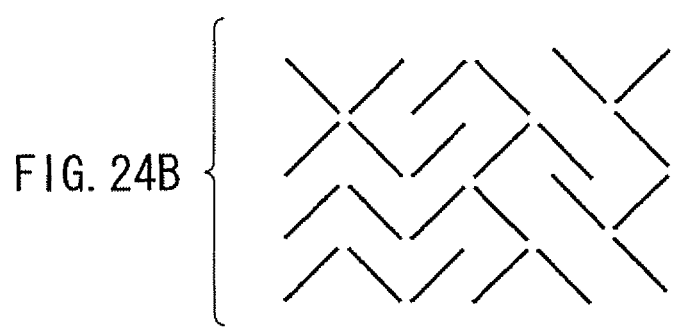
Figure 24C:
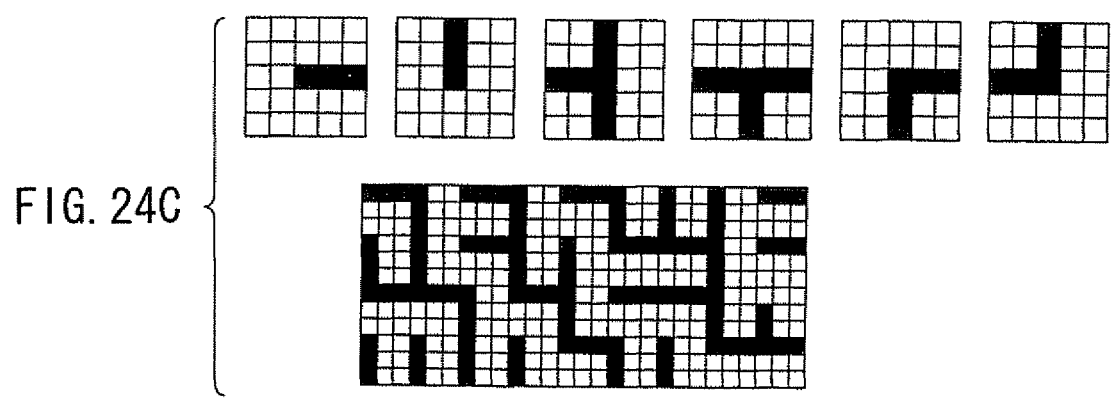
Figure 24D:
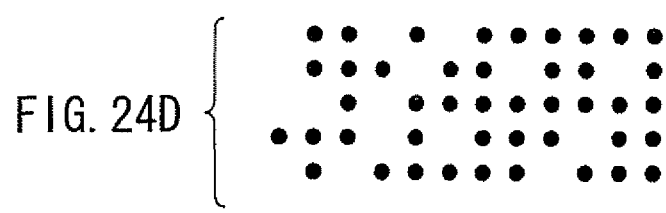

FIG. 23 is a partial cross-sectional diagram showing a schematic configuration of the electronic paper capable of overwriting on the color image. The electronic paper 10 is provided with the transparent display substrate 20 and the rear surface substrate 22. The display substrate 20 is arranged so as to be opposed to the rear surface substrate 22 with a predetermined gap therebetween. Between the display substrate 20 and the rear surface substrate 22, the two-color rotating particle 24, which is colored half in white and half in black, a red charged particle 25M, a blue charged particle 25C, a yellow charged particle 25Y and transparent liquid 26 are enclosed. Also, on the surface of the display substrate 20, a number of code patterns 28 representing the positional information are formed.

The two-color particle 24 is the particle, which is 10 to 100 μm in size, and of which magnetization state is different between two colors such that the white side is the north pole and the black side is the south pole. The red charged particle 25M, the blue charged particle 25C, the yellow charged particle 25Y are the particles, which are 10 to 100 μm in size, positively or negatively charged. Herein, applied voltage V1 (absolute value) required for moving the red charged particle 25M, applied voltage V2 (absolute value) required for moving the blue charged particles 25C, and applied voltage V3 (absolute value) required for moving the yellow charged particles 25Y are different to one another.

For example, where V1, V2 and V3 are represented as V1<V2<V3, when it is wanted to display the red color, the voltage V1 is applied to move the charged particle 25M to the display substrate 20 side. When it is wanted to display the blue color, the voltage V2 is applied to move the charged particles 25M and 25C to the display substrate 20 side, and thereafter, the voltage V1 is applied in the opposite direction to move the charged particle 25M to the rear surface substrate 22 side. When it is wanted to display the yellow color, the voltage VS is applied to move the three colors of charged particles 25M, 25C and 25Y to the display substrate 20 side, and thereafter, the voltage V2 is applied in the opposite direction to move other two colors of charged particles 25M and 25C to the rear surface substrate 22 side. Meanwhile, FIG. 23 shows a state in which the yellow color is displayed.

In this manner, by changing the applied voltage for each pixel depending on the image data, it is possible to display the color image on the electronic paper 10. Also, on the color image displayed on the electronic paper 10, it is possible to perform the handwritten input by rotating the two-color rotating particle 24 by the stylus writing device 12 provided with the magnetic recording head, as in the above-described exemplary embodiment.

—Modified Example of Code Pattern—

Although the example using the code pattern (9C2 pattern) in which nine dots (printing area) are provided in the block having the size of 12×12 pixels and any two dots out of the nine dots are selected to display the information as shown in FIG. 4 has been described in the above-described exemplary embodiment, the code pattern capable of optically reading the positional information of the penpoint may be used, and it is not limited to this code pattern. Similarly, also in the code pattern in which a certain number of dots are selectively arranged in the block, which is the information unit, the size of the block, the arrangement of the dots (printing area) and the number of the dots (printing dot) to be selected may be appropriately changed.

Also, as shown in FIGS. 24A to 24D, the conventionally known code pattern may be used. In the code pattern shown in FIG. 24A, a virtual lattice frame is arranged and a dot is arranged in any one of four areas separated by cross points of the lattice. Thereby, it becomes possible to represent four kinds of patterns and it is possible to represent 2 bits, as referred to Japanese Patent Application National Publication (Laid-Open) No. 2003-511762. Also, in the code pattern shown in FIG. 24B, 1 bit is represented by right and left diagonal straight lines, called as a glyph code, as referred to JP-A No. 09-185669. In the code pattern shown in FIG. 24C, the information is represented by a combination of graphic patterns of straight line and a key shape, as referred to JP-A No. 2004-152273. Also, in the code pattern shown in FIG. 24D, the information is represented by on/off of the dots, as referred to U.S. Pat. No. 2,833,975.

In addition, although the example in which the code pattern is formed on the surface of the display substrate has been described in the above-described exemplary embodiment, this has only to be optically read, and this may be formed within the display substrate and on a rear surface of the display substrate.

—Modified Example of Decoding Process—

Although the example in which the code pattern read by the optical sensor is decoded by the microprocessor mounted on the stylus writing device to obtain the positional information of the penpoint has been described in the above-described exemplary embodiment, it is also possible to input the read image data to the computer and perform the decoding process of the code pattern on the computer side.

—Display of Page Identification Information—

A method for obtaining the pace identification information (page ID) is not described in the above-described exemplary embodiment, however, it is possible to relate the handwritten input data to the original document data and store the same, by simultaneously displaying the page identification information on a portion of the displayed image, such as on a right upper corner of the display screen, when displaying the document image on the electronic paper 10 as shown in FIG. 2A, and by reading the page identification information by the optical sensor 18 of the stylus writing device 12 before and after performing the handwritten input as shown in FIG. 1, thereby allowing the stylus writing device 12 to recognize the page identification information.

The foregoing description of the exemplary embodiments of the present invention has been provided for the purpose of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A data input system comprising:
electronic paper comprising a transparent display substrate on which a number of optically readable code patterns have been formed, the optically readable code patterns representing positional information on a display surface, a rear surface substrate opposing the display substrate, and coloring particles that are enclosed between the display substrate and the rear surface substrate and that are movable by applying an electric field or a magnetic field, the electronic paper displaying an image by motion of the coloring particles; and
a stylus writing device comprising a writing head provided at the end of the stylus for writing an image by applying an electric field or a magnetic field to the electronic paper by contact with the electronic paper, and an optical reading device for optically reading the code patterns formed on the display surface where the end of the stylus contacts, the code patterns read by the optical reading device representing the positional information of the stylus writing device on the display surface, wherein
the optically readable code pattern is a code pattern obtained by selectively arranging a plurality of a certain number of dots within blocks that are information units,
each block contains a same number of said certain number of dots, and
the transparent display substrate does not include a special dot pattern that indicates either: i) a boundary between blocks, or ii) a block direction within the optically readable code pattern.

2. The data input system according to claim 1, wherein the stylus writing device further comprises a decoding unit for decoding pattern data of the read code patterns into positional information, and a storing unit for storing the decoded positional information.

3. The data input system according to claim 2, wherein the stylus writing device further comprises a sending unit for sending the decoded positional information to an external device.

4. The data input system according to claim 1, further comprising an information processing device, the information processing device comprising: a receiving unit for receiving the positional information that has been sent from the stylus writing device; and a database that relates and manages image data of the image that has been displayed on the electronic paper with the positional information using page identification information.

5. The data input system according to claim 3, further comprising: an information processing device, the information processing device comprising a receiving unit for receiving the positional information that has been sent from the stylus writing device; and a database that relates and manages image data of the image that has been displayed on the electronic paper with the positional information using page identification information.

6. The data input system according to claim 4, wherein the information processing device further comprises an image processing unit that acquires image data of a handwritten input image that has been written by the stylus writing device based on the positional information, and that synthesizes the image data of the display image related by the page identification information and the image data of the handwritten input image.

7. The data input system according to claim 5, wherein the information processing device further comprises an image processing unit that acquires image data of a handwritten input image that has been written by the stylus writing device based on the positional information, and that synthesizes the image data of the display image related by the page identification information and the image data of the handwritten input image.

8. A data input system comprising:

electronic paper comprising a transparent display substrate on which a number of optically readable code patterns have been formed, the optically readable code patterns representing positional information on a display surface, a rear surface substrate opposing the display substrate, and coloring particles that are enclosed between the display substrate and the rear surface substrate and that are movable by applying an electric field or a magnetic field, the electronic paper displaying an image by motion of the coloring particles;

a stylus writing device comprising a writing head provided at the end of the stylus for writing an image by applying an electric field or a magnetic field to the electronic paper by contact with the electronic paper, an optical reading device for optically reading the code patterns formed on the display surface where the end of the stylus contacts, and a sending unit for sending pattern data of the read code patterns to an external device; and a management device comprising a receiving unit for receiving the pattern data sent from the stylus writing device, a decoding unit for decoding the received pattern data into the positional information, a storing unit for storing the decoded positional information, and a database that relates and manages the image data of the image that has been displayed on the electronic paper with the positional information using page identification information, wherein the optically readable code pattern is a code pattern obtained by selectively arranging a plurality of a certain number of dots within blocks that are information units, each block contains a same number of said certain number of dots, and the transparent display substrate does not include a special dot pattern that indicates either: i) a boundary between blocks, or ii) a block direction within the optically readable code pattern.

9. The data input system according to claim 1, wherein the optically readable code pattern is formed by an invisible recording material that absorbs infrared rays or ultraviolet rays.

10. The data input system according to claim 6, wherein the optically readable code pattern is formed by an invisible recording material that absorbs infrared rays or ultraviolet rays.

11. A data input method comprising:

writing an image by applying an electric field or a magnetic field to electronic paper that displays an image by motion of coloring particles that are movable by applying an electric field or a magnetic field;

optically reading code patterns formed on the display surface;

sending pattern data of the read code patterns to an external device;

receiving the sent pattern data;

decoding the received pattern data into the positional information:

storing the decoded positional information; and relating and managing the image data of the image that has been displayed on the electronic paper with the positional information using page identification information, wherein the optically readable code pattern is a code pattern obtained by selectively arranging a plurality of a certain number of dots within blocks that are information units, each block contains a same number of said certain number of dots, and blocks in the optically readable code pattern are not separated by a special dot pattern that indicates either: i) a boundary between the blocks, or ii) a block direction.

12. The data input system according to claim 1, wherein the optically readable code patterns include (1) x-coordinate code patterns, (2) y-coordinate code patterns, and (3) synchronous code patterns representing a rotational orientation of the optically readable code patterns.

13. The data input system according to claim 1, the coloring particles being two-color rotating particles, each coloring particle having a first and second side, a color of the first side being different than a color of the second side, and the two-color rotating particles being configured to rotate between the first and second side by the application of the electric field or magnetic field.

14. A data input system comprising:

electronic paper comprising a transparent display substrate on which a number of optically readable code patterns have been formed, the optically readable code patterns representing positional information on a display surface, a rear surface substrate opposing the display substrate, and coloring particles that are enclosed between the display substrate and the rear surface substrate and that are movable by applying an electric field or a magnetic field, the electronic paper displaying an image by motion of the coloring particles; and a stylus writing device comprising a writing head provided at the end of the stylus for writing an image by applying an electric field or a magnetic field to the electronic paper by contact with the electronic paper, and an optical reading device for optically reading the code patterns formed on the display surface where the end of the stylus contacts, the code patterns read by the optical reading device representing the positional information of the stylus writing device on the display surface, wherein the transparent display substrate does not include a special dot pattern that indicates either: i) a boundary between blocks, or ii) a block direction within the optically readable code pattern, and each code pattern is specified by a block containing a predetermined number of dots and a predetermined number of dot positions, and the optical reading device identifies each block of the code pattern by:

reading an image in the vicinity of the end of the stylus;

shifting block frames dot position by dot position over the read image until the position is found in which each block frame contains the same number of said predetermined number of dots; and identifying each of said block frames as each block.

15. A data input system comprising:

electronic paper comprising a transparent display substrate on which a number of optically readable code patterns have been formed, the optically readable code patterns representing positional information on a display surface, a rear surface substrate opposing the display substrate, and coloring particles that are enclosed between the display substrate and the rear surface substrate and that are movable by applying an electric field or a magnetic field, the electronic paper displaying an image by motion of the coloring particles; and a stylus writing device comprising a writing head provided at the end of the stylus for writing an image by applying an electric field or a magnetic field to the electronic paper by contact with the electronic paper, and an optical reading device for optically reading the code patterns formed on the display surface where the end of the stylus contacts, the code patterns read by the optical reading device representing the positional information of the stylus writing device on the display surface, wherein
the optically readable code pattern is a code pattern obtained by selectively arranging a predefined number of dots within each block, each block being an information unit, each dot being arranged at least one dot width away from each other dot, each block contains a same predefined number of dots, and there is no special dot pattern that indicates either: i) a boundary between blocks, or ii) a block direction within the optically readable code pattern.

* * * * *